(12) United States Patent
Fuji et al.

(10) Patent No.: US 8,865,855 B2
(45) Date of Patent: Oct. 21, 2014

(54) POLYCARBONATE COPOLYMER AND METHOD OF PRODUCING THE SAME

(75) Inventors: Michiaki Fuji, Mie (JP); Minako Akita, Mie (JP); Tomohiko Tanaka, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 829 days.

(21) Appl. No.: 12/305,660

(22) PCT Filed: Jun. 14, 2007

(86) PCT No.: PCT/JP2007/062037
§ 371 (c)(1),
(2), (4) Date: Apr. 1, 2009

(87) PCT Pub. No.: WO2007/148604
PCT Pub. Date: Dec. 27, 2007

(65) Prior Publication Data
US 2010/0190953 A1    Jul. 29, 2010

(30) Foreign Application Priority Data

Jun. 19, 2006  (JP) .................................. 2006-168929

(51) Int. Cl.
*C08G 64/00* (2006.01)
*C08G 64/30* (2006.01)
*C08G 64/02* (2006.01)

(52) U.S. Cl.
CPC .......... *C08G 64/0208* (2013.01); *C08G 64/305* (2013.01)
USPC ........... 528/196; 525/436; 528/198; 528/271; 528/272; 528/370; 528/371

(58) Field of Classification Search
USPC .......... 525/436; 528/196, 198, 271, 272, 370, 528/371
See application file for complete search history.

(56) References Cited

U.S. PATENT DOCUMENTS

2010/0190953 A1    7/2010  Fuji et al.

FOREIGN PATENT DOCUMENTS

| EP | 1 640 400 A1 | 3/2006 |
|---|---|---|
| GB | 1079686 | 8/1967 |
| JP | 56-55425 | 5/1981 |
| JP | 63-12896 | 3/1988 |
| JP | 6-145336 | 5/1994 |
| JP | 2006-28441 | 2/2006 |
| JP | 2006-232897 | 9/2006 |
| JP | 2007-70391 | 3/2007 |
| JP | 2007-70438 | 3/2007 |
| JP | 2009-046519 | 3/2009 |
| TW | 200502271 | 1/2005 |
| WO | WO 2004/111106 A1 | 12/2004 |
| WO | WO 2006/041190 A1 | 4/2006 |
| WO | WO 2007/063823 A1 | 6/2007 |

OTHER PUBLICATIONS

Office Action issued Feb. 24, 2011, in European Patent Application No. 07 745 294.4.
Extended European Search Report issued Mar. 3, 2011, in Patent Application No. 10195782.7.
Office Action issued Mar. 22, 2011, in Chinese Patent Application No. 200780017926.X (with English-language translation).
U.S. Appl. No. 12/747,724, filed Jun. 11, 2010, Fuji, et al.
U.S. Appl. No. 12/808,058, filed Jun. 14, 2010, Fuji, et al.
Office Action issued Aug. 26, 2010, in China Patent Application No. 200780017926.X (with English-language Translation).
Office Action issued Oct. 10, 2011, in Chinese Patent Application No. 200780017926.X (with English-language translation).
European Office Action issued Dec. 9, 2011, in Patent Application No. 07 745 294.4.
European Office Action issued Dec. 9, 2011, in Patent Application No. 10 195 782.7.
Office Action issued Jun. 25, 2012 in Chinese Patent Application No. 201110178846.0 (with English-language translation).
Euorpean Search Report issued Jul. 24, 2012 in European Patent Application No. 12163995.
U.S. Appl. No. 13/474,224, filed May 17, 2012, Tanaka, et al.
Office Action in Japanese corresponding Application No. 2007-156525 dated Feb. 15, 2013. (w/English Translation).
Chinese Office Action in corresponding Chinese Application No. 201110178846.0 dated Feb. 17, 2013 (w/English Translation).

(Continued)

*Primary Examiner* — Gregory Listvoyb
(74) *Attorney, Agent, or Firm* — Oblon, Spivak, McClelland, Maier & Neustadt, L.L.P.

(57) ABSTRACT

The problem to be solved by the present invention is to provide a polycarbonate copolymer containing a plant-derived raw material, which is excellent in the mechanical strength and heat-resistant and assured of small refractive index, large Abbe number, small birefringence and excellent transparency. The present invention provides a polycarbonate copolymer containing a constitutional unit derived from a dihydroxy compound represented by the following formula (1) and a constitutional unit derived from an alicyclic dihydroxy compound, wherein the Abbe number is 50 or more and the 5% thermal reduction temperature is 340° C. or more; and a method of producing this polycarbonate copolymer by reacting a dihydroxy compound represented by the following formula (1) and an alicyclic hydroxy compound with a carbonic acid diester in the presence of a polymerization catalyst.

[Chem. 1]

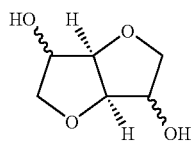

(1)

23 Claims, 2 Drawing Sheets

(56) References Cited

OTHER PUBLICATIONS

Japanese Office Action Taiwanese application No. 096121867, dated Jan. 21, 2013 (w/English Translation).

Taiwanese Office Action in corresponding application No. 10221244290 dated Sep. 14, 2013.

Office Action in corresponding Chinese Application 201110178846.0 dated Mar. 24, 2014. (w/English translation).

Office Action in corresponding Japanese Application 2013-086749, issued on Apr. 22, 2014. (w/English translation).

Office Action in corresponding Taiwanese application No. 01273/10320958680 dated Jul. 15, 2014. (w/English Translation).

POLYCARBONATE COPOLYMER AND METHOD OF PRODUCING THE SAME

TECHNICAL FIELD

The present invention relates to a polycarbonate copolymer containing a constitutional unit derivable from a carbohydrate such as starch which is a biomass resource, which is excellent in the heat resistance, moldability and mechanical strength and assured of excellent optical property such as small refractive index and large Abbe number, and a method of producing the same.

BACKGROUND ART

A polycarbonate is generally produced using a raw material derived from a petroleum resource. However, due to recent fear of exhaustion of petroleum resources, it is demanded to provide a polycarbonate using a raw material obtained from a biomass resource such as plant. Also, because of concern that global warming resulting from increase or accumulation of carbon dioxide emissions may bring about climate change or the like, it is demanded to develop a polycarbonate using a plant-derived monomer as the raw material and being carbon neutral even after treating a disposal use.

Conventionally, a technique of obtaining a polycarbonate by using isosorbide as a plant-derived monomer and effecting transesterification with diphenyl carbonate has been proposed (see, for example, Patent Document 1). However, the polycarbonate obtained is brown and is not satisfied. As for the copolymer carbonate of isosorbide and other dihydroxy compounds, a polycarbonate obtained by copolymerizing bisphenol A has been proposed (see, for example, Patent Document 2), and an attempt to improve the rigidity of a homopolycarbonate composed of isosorbide by copolymerizing isosorbide and an aliphatic diol has been made (see, for example, Patent Document 3).

On the other hand, as for the polycarbonate obtained by polymerizing 1,4-cyclohexanedimethanol which is an alicyclic dihydroxy compound, a large number of proposals have been made (see, for example, Patent Documents 4 and 5), but these polycarbonates are a low-molecular-weight polycarbonate having a molecular weight of about 4,000 at most and therefore, many products have a low glass transition temperature.

In this way, a large number of polycarbonates using isosorbide have been proposed, nevertheless, a polycarbonate obtained by copolymerizing isosorbide and an alicyclic dihydroxy compound is not reported and optical constants such as refractive index and Abbe number are also not disclosed.

Patent Document 1: GB 1079686
Patent Document 2: JP-A-56-55425
Patent Document 3: WO2004/111106
Patent Document 4: JP-A-6-145336
Patent Document 5: JP-B-63-12896

DISCLOSURE OF THE INVENTION

Problems to be Resolved by the Invention

The polycarbonates described in Patent Documents 1 to 5 are insufficient in terms of heat resistance and transparency as compared with conventional aromatic polycarbonates derived from a petroleum raw material and can be hardly used for an optical material or a molding material. Accordingly, it is hoped to develop a high-transparency polycarbonate having a small refractive index and a small Abbe number while maintaining high heat resistance and transparency of an aromatic polycarbonate.

The purpose of the present invention is to solve the conventional problems described above and provide a polycarbonate copolymer containing a plant-derived constitutional unit, which is excellent in the mechanical strength and heat-resistant and assured of small refractive index, large Abbe number, small birefringence and excellent transparency.

Means for Solving the Problems

As a result of intensive studies to solve the above-mentioned purpose, the present inventors have found that a polycarbonate copolymer obtained from a dihydroxy compound represented by the following formula (1) and an alicyclic dihydroxy compound is excellent in the mechanical strength and heat-resistant and assured of small refractive index, large Abbe number, small birefringence and excellent transparency. The present invention has been accomplished based on this discovery.

That is, the essential features of the present invention consist in [1] to [13] below.

[1] A polycarbonate copolymer containing a constitutional unit derived from a dihydroxy compound represented by the following formula (1) and a constitutional unit derived from an alicyclic dihydroxy compound, wherein the Abbe number is 50 or more and the 5% thermal reduction temperature is 340° C. or more:

[Chem. 1]

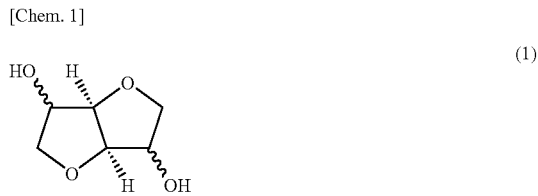

(1)

[2] A polycarbonate copolymer containing a constitutional unit derived from a dihydroxy compound represented by the following formula (1) and a constitutional unit derived from an alicyclic dihydroxy compound, wherein the ratio of the dihydroxy compound represented by the following formula (1) and the alicyclic dihydroxy compound to all dihydroxy compounds constituting the copolymer is 90 mol % or more:

[Chem. 2]

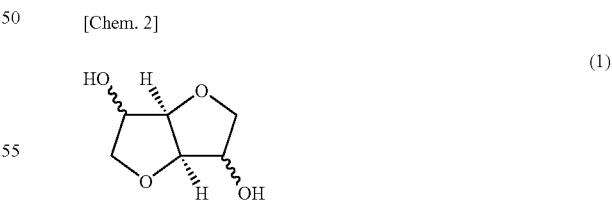

(1)

[3] The polycarbonate copolymer as described in [1], wherein the ratio of the dihydroxy compound represented by formula (1) and the alicyclic dihydroxy compound to all dihydroxy compounds constituting the polycarbonate copolymer is 90 mol % or more.

[4] The polycarbonate copolymer as described in any one of [1] to [3], wherein the alicyclic dihydroxy compound contains a 5-membered ring structure or a 6-membered ring structure.

[5] The polycarbonate copolymer as described in [4], wherein the number of carbon atoms contained in the alicyclic dihydroxy compound is 30 or less.

[6] The polycarbonate copolymer as described in [5], wherein the alicyclic dihydroxy compound is at least one compound selected from the group consisting of cyclohexanedimethanol, tricyclodecanedimethanol, adamantanediol and pentacyclopentadecanedimethanol.

[7] The polycarbonate copolymer as described in any one of [1] to [6], wherein the photoelastic coefficient is $20 \times 10^{-12}$ $Pa^{-1}$ or less.

[8] The polycarbonate copolymer as described in any one of [1] to [7], wherein the Izod impact strength is 30 $J/m^2$ or more.

[9] The polycarbonate copolymer as described in any one of [1] to [8], wherein the amount of the generated gas except for a phenol component per unit area at 110° C. is 5 $ng/cm^2$ or less.

[10] The polycarbonate copolymer as described in any one of [1] to [9], wherein a constitutional unit derived from at least one member selected from the group consisting of isosorbide, isomannide and isoidide is contained as the constitutional unit derived from a dihydroxy compound represented by formula (1).

[11] The polycarbonate copolymer as described in any one of [1] to [10], wherein the reduced viscosity for a concentration of 1.00 g/dl at 20° C.±0.1° C. in a solution of phenol and 1,1,2,2-tetrachloroethane at a weight ratio of 1:1 is 0.40 dl/g or more.

[12] A method of producing the polycarbonate copolymer described in any one of [1] to [11], comprising reacting a dihydroxy compound represented by the following formula (1) and an alicyclic dihydroxy compound with a carbonic acid diester in the presence of a polymerization catalyst:

[Chem. 3]

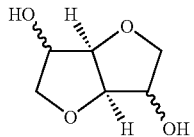

(1)

[13] The method of producing the polycarbonate copolymer as described in [12], wherein an alkali metal compound and/or an alkaline earth metal compound are used as the polymerization catalyst.

Effect of the Invention

The polycarbonate copolymer of the present invention has high thermal stability, low refractive index, large Abbe number and small optical anisotropy. Also, the mechanical strength is excellent and the glass transition temperature can be adjusted between 45° C. and 155° C. according to usage, which enables providing a material to the field of film or sheet requiring flexibility, to the field of bottle or container requiring heat resistance, and to a wide range of fields including lens usage such as camera lens, viewfinder lens and lens for CCD or CMOS, and usage as a film or sheet such as phase difference film, diffusing sheet or polarizing film utilized in liquid crystal or plasma display devices, as an optical disc, as an optical material, as an optical component or as a binder for fixing a dye, a charge transfer agent or the like.

BEST MODE FOR CARRYING OUT THE INVENTION

Figure 1:
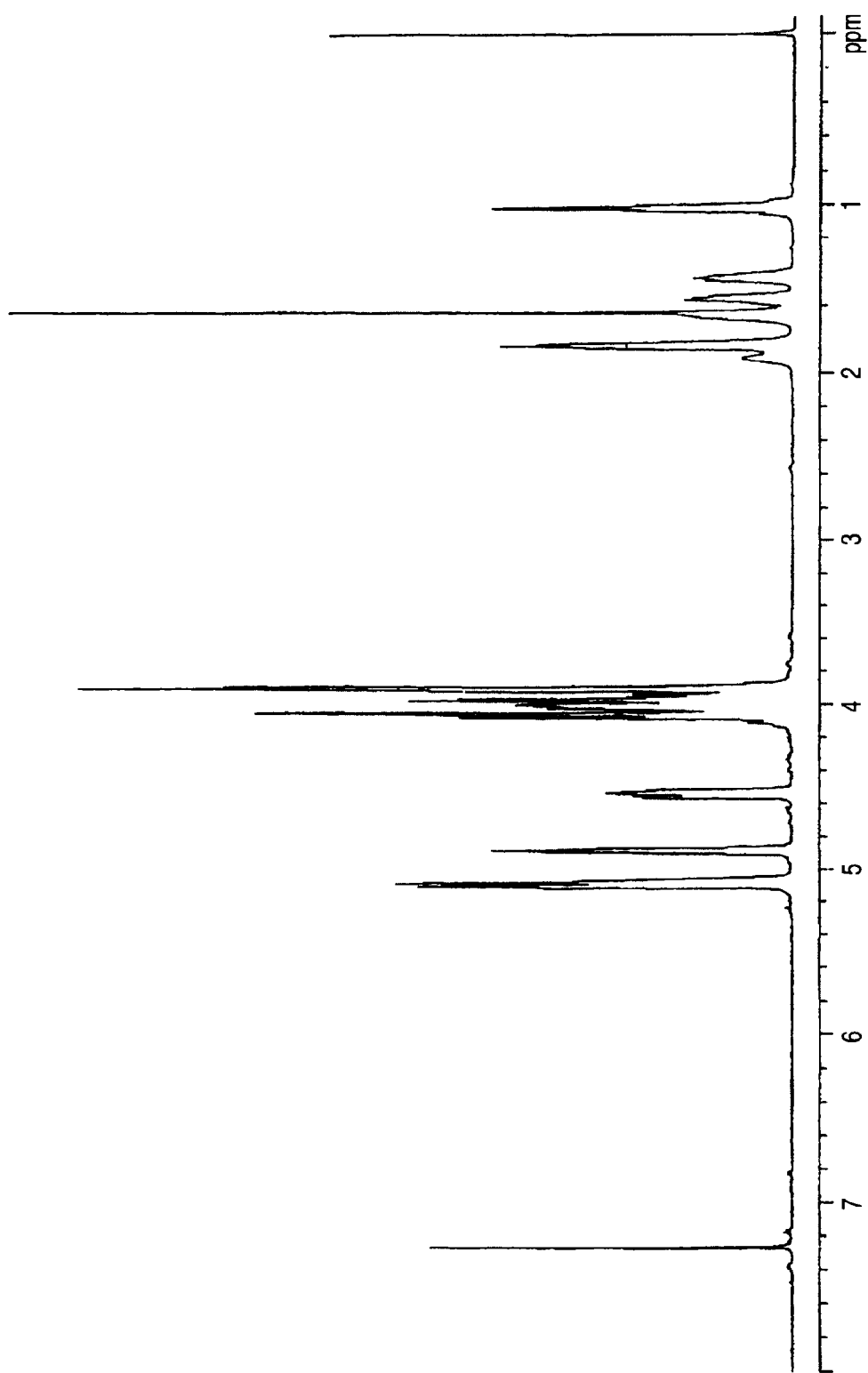
FIG. 1 is a view showing an NMR chart of the polycarbonate copolymer produced in Example 1.

The embodiment of the present invention is described in detail below, but the construction requirements described below are mere examples (representative examples) of the embodiment of the present invention and as long as the essential features of the invention are observed, the present invention is not restricted to the following contents.

The polycarbonate copolymer of the present invention is characterized by containing a constitutional unit derived from a dihydroxy compound represented by the following formula (1) and a constitutional unit derived from an alicyclic dihydroxy compound:

[Chem. 4]

(1)

In the present invention, the dihydroxy compound represented by formula (1) includes isosorbide, isomannide and isoidide, which are in a stereoisomeric relationship with each other. One of these compounds may be used alone, or two or more thereof may be used in combination.

Among these dihydroxy compounds, in view of facility of availability and production, optical characteristics and moldability, most preferred compound is isosorbide obtained by dehydration-condensing sorbitol produced from various starches which are abundantly present as a resource and easily available.

Meanwhile, isosorbide is liable to be gradually oxidized by oxygen and for preventing decomposition due to oxygen during storage or handling at the production, it is important to avoid mixing of moisture, use a deoxidizer or keep in a nitrogen atmosphere. When isosorbide is oxidized, a decomposition product including formic acid is generated. For example, if a polycarbonate is produced using isosorbide containing such a decomposition product, this causes coloration of the obtained polycarbonate or serious deterioration in the physical properties. Also, the polymerization reaction is affected and a polymer having a high molecular weight may not be obtained, which is not preferred. Furthermore, in the case where a stabilizer for preventing generation of a formic acid is added, depending on the kind of the stabilizer, the obtained polycarbonate may be colored or seriously deteriorated in the physical properties. As for the stabilizer, a reducing agent or an antacid is used. The reducing agent includes sodium borohydride, lithium borohydride and the like, and the antacid includes an alkali such as sodium hydroxide, but the addition of such an alkali metal salt is not preferred, because the alkali metal also serves as a polymerization catalyst and when added excessively, makes it impossible to control the polymerization reaction.

If desired, the isosorbide may be distilled for obtaining isosorbide containing no oxidation decomposition product. Furthermore, in the case where a stabilizer is blended so as to prevent oxidation or decomposition of isosorbide, the isosorbide may also be distilled, if desired. In such a case, the distillation of isosorbide is not particularly limited and may be simple distillation or continuous distillation. After the atmosphere is turned into an inert gas atmosphere such as argon or nitrogen, the distillation is performed under reduced pressure.

In the present invention, high-purity isosorbide having a formic acid content of 20 PPM or less, particularly 5 PPM or less, is preferably used by performing the above-mentioned distillation of isosorbide. Now, a method for measuring the formic acid content in isosorbide is described later in Examples.

On the other hand, the alicyclic dihydroxy compound which can be used in the present invention is not particularly limited, but usually, a compound containing a 5-membered ring structure or a 6-membered ring structure is used. The 6-membered ring structure may be fixed in the form of a chair or boat by covalent bonding. By virtue of the alicyclic dihydroxy compound containing a 5-membered ring or a 6-membered ring structure, the obtained polycarbonate can be increased in the heat resistance. The number of carbon atoms contained in the alicyclic dihydroxy compound is usually 70 or less, preferably 50 or less, more preferably 30 or less. As this value is larger, higher heat resistance is obtained, but the synthesis or purification becomes difficult or the cost becomes high. As the number of carbon atoms is smaller, the purification is facilitated and the availability becomes easy.

The alicyclic dihydroxy compound containing a 5-membered ring structure or a 6-membered ring structure for use in the present invention specifically includes alicyclic dihydroxy compounds represented by the following formula (II) or (III):

$$HOCH_2-R^1-CH_2OH \quad (II)$$

$$HO-R^2-OH \quad (III)$$

(in formulae (II) and (III), $R^1$ and $R^2$ each represents a cycloalkyl group having a carbon number of 4 to 20 or a cycloalkoxyl group having a carbon number of 6 to 20).

The cyclohexanedimethanol which is the alicyclic dihydroxy compound represented by formula (II) includes various isomers where in formula (II), $R^1$ is represented by the following formula (IIa) (wherein $R^3$ represents an alkyl group having a carbon number of 1 to 12). Specific examples thereof include 1,2-cyclohexanedimethanol, 1,3-cyclohexanedimethanol and 1,4-cyclohexanedimethanol.

[Chem. 5]

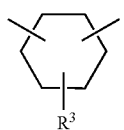

(IIa)

The tricyclodecanedimethanol and pentacyclopentadecanedimethanol which are the alicyclic dihydroxy compound represented by formula (II) include various isomers where in formula (II), $R^1$ is represented by the following formula (IIb) (wherein n represents 0 or 1).

[Chem. 6]

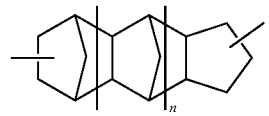

(IIb)

The decalindimethanol and tricyclotetradecane-dimethanol which are the alicyclic dihydroxy compound represented by formula (II) include various isomers where in formula (II), $R^1$ is represented by the following formula (IIc) (wherein m represents 0 or 1). Specific examples thereof include 2,6-decalindimethanol, 1,5-decalindimethanol and 2,3-decalindimethanol.

[Chem. 7]

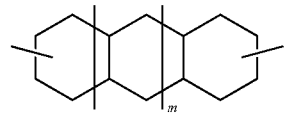

(IIc)

The norbornanedimethanol which is the alicyclic dihydroxy compound represented by formula (II) includes various isomers where in formula (II), $R^1$ is represented by the following formula (IId). Specific examples thereof include 2,3-norbornanedimethanol and 2,5-norbornanedimethanol.

[Chem. 8]

(IId)

The adamantanedimethanol which is the alicyclic dihydroxy compound represented by formula (II) includes various isomers where in formula (II), $R^1$ is represented by the following formula (IIe). Specific examples thereof include 1,3-adamantanedimethanol.

[Chem. 9]

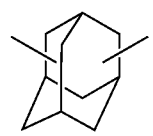

(IIe)

The cyclohexanediol which is the alicyclic dihydroxy compound represented by formula (III) includes various isomers where in formula (III), $R^2$ is represented by the following formula (IIIa) (wherein $R^3$ represents an alkyl group having a carbon number of 1 to 12). Specific examples thereof include 1,2-cyclohexanediol, 1,3-cyclohexanediol, 1,4-cyclohexanediol and 2-methyl-1,4-cyclohexanediol.

[Chem. 10]

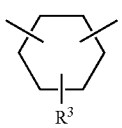

(IIIa)

The tricyclodecanediol which is the alicyclic dihydroxy compound represented by formula (III) includes various isomers where in formula (III), $R^2$ is represented by the following formula (IIIb) (wherein n represents 0 or

[Chem. 11]

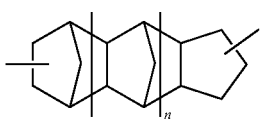

(IIIb)

The decalindiol and tricyclotetradecanediol which are the alicyclic dihydroxy compound represented by formula (III) include various isomers where in formula (III), $R^2$ is represented by the following formula (IIIc) (wherein m represents 0 or 1). Specific examples thereof include 2,6-decalindiol, 1,5-decalindiol and 2,3-decalindiol.

[Chem. 12]

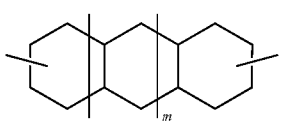

(IIIc)

The norbornanediol which is the alicyclic dihydroxy compound represented by formula (III) includes various isomers where in formula (III), $R^2$ is represented by the following formula (IIId). Specific examples thereof include 2,3-norbornanediol and 2,5-norbornanediol.

[Chem. 13]

(IIId)

The adamantanediol which is the alicyclic dihydroxy compound represented by formula (III) includes various isomers where in formula (III), $R^2$ is represented by the following formula (IIIe). Specific examples thereof include 1,3-adamantanediol.

[Chem. 14]

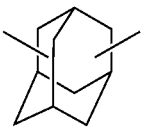

(IIIe)

Among these specific examples of alicyclic hydroxy compounds, cyclohexanedimethanols, tricyclodecanedimethanols, adamantanediols and pentanecyclopentadecanedimethanols are particularly preferred, and in view of facility of availability and handling, 1,4-cyclohexanedimethanol, 1,3-cyclohexanedimethanol, 1,2-cyclohexanedimethanol and tricyclodecanedimethanol are preferred.

Incidentally, the compounds illustrated above are mere examples of the alicyclic dihydroxy compound which can be used in the present invention, and the present invention is not limited thereto. One of these alicyclic diol compounds may be used alone, or two or more thereof may be mixed and used.

As for the ratio between the constitutional unit derived from a dihydroxy compound represented by formula (1) and the constitutional unit derived from an alicyclic dihydroxy compound, which are contained in the polycarbonate copolymer of the present invention, the ratio may be arbitrarily selected but is preferably constitutional unit derived from a dihydroxy compound represented by formula (1): constitutional unit derived from an alicyclic dihydroxy compound=from 1:99 to 99:1 (mol %), particularly preferably constitutional unit derived from a dihydroxy compound represented by formula (1): constitutional unit derived from an alicyclic dihydroxy compound=from 10:90 to 90:10 (mol %). If the constitutional unit derived from a dihydroxy compound represented by formula (1) exceeds this range and the constitutional unit derived from an alicyclic dihydroxy compound is less than the range above, coloration of the polycarbonate obtained readily occurs, whereas if the constitutional unit derived from a dihydroxy compound represented by formula (1) is less than the range above and the constitutional unit derived from an alicyclic dihydroxy compound exceeds the range above, the molecular weight tends to be difficult to increase.

The polycarbonate copolymer of the present invention may contain a constitutional unit derived from a dihydroxy compound (hereinafter, sometimes referred to as "the other dihydroxy compound") other than the dihydroxy compound represented by formula (1) and the alicyclic dihydroxy compound. In this case, examples of the other dihydroxy compound include aliphatic dihydroxy compounds such as ethylene glycol, 1,3-propanediol, 1,2-propanediol, 1,4-butanediol, 1,3-butanediol, 1,2-butanediol, 1,5-heptanediol and 1,6-hexanediol; oxyalkylene glycols such as diethylene glycol, triethylene glycol and tetraethylene glycol; and aromatic bisphenols such as 2,2-bis(4-hydroxyphenyl)propane [=bisphenol A], 2,2-bis(4-hydroxy-3,5-dimethylphenyl)propane, 2,2-bis(4-hydroxy-3,5-diethyl-phenyl)propane, 2,2-bis(4-hydroxy-(3,5-diphenyl)phenyl)-propane, 2,2-bis(4-hydroxy-3,5-dibromophenyl)propane, 2,2-bis(4-hydroxyphenyl)pentane, 2,4'-dihydroxy-diphenyl-methane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)-cyclohexane, bis(4-hydroxyphenyl)sulfone, 2,4'-dihydroxydiphenylsulfone, bis(4-hydroxyphenyl)sulfide, 4,4'-dihydroxydiphenyl ether, 4,4'-dihydroxy-3,3'-dichlorodiphenyl ether, 4,4'-dihydroxy-2,5-diethoxydiphenyl ether, 9,9-bis(4-(2-hydroxyethoxy)-phenyl)fluorene, 9,9-bis(4-(2-hydroxyethoxy-2-methyl)-phenyl)fluorene, 9,9-bis(4-hydroxyphenyl)fluorene, and 9,9-bis(4-hydroxy-2-methylphenyl)fluorene. One member or two or more members thereof may be used.

Effects such as improvement of flexibility, enhance-ment of heat resistance and improvement of moldability may be obtained by using such other dihydroxy compound, but if a constitutional unit derived from the other dihydroxy compound is contained in an excessively large proportion, original optical characteristics may be deteriorated in the performance. Therefore, in the polycarbonate copolymer of the present invention, the total ratio of the dihydroxy compound represented by formula (1) and the alicyclic dihydroxy compound to all dihydroxy compounds constituting the polycarbonate copolymer is preferably 90 mol % or more. In particular, the polycarbonate copolymer of the present invention is preferably composed of, in terms of the dihydroxy compound, only the dihydroxy compound represented by formula (1) and the alicyclic dihydroxy compound.

The polymerization degree of the polycarbonate copolymer of the present invention is preferably a polymerization degree such that the reduced viscosity measured at a temperature of 20.0° C.±0.1° C. by using, as the solvent, a mixed solution of phenol and 1,1,2,2-tetrachloroethane at a weight ratio of 1:1 and precisely adjusting the polycarbonate copolymer concentration to 1.00 g/dl (hereinafter simply referred to as a "reduced viscosity of the polycarbonate copolymer") is 0.40 dl/g or more, particularly from 0.40 to 2.0 dl/g. If the reduced viscosity of the polycarbonate copolymer is excessively low, the mechanical strength of a lens or the like molded is weak, whereas if the reduced viscosity of the polycarbonate copolymer becomes large, flowability at the molding decreases and this tends to bring about reduction in the cycle property and a large birefringence of the molded article. Accordingly, the reduced viscosity of the polycarbonate copolymer of the present invention is preferably from 0.40 to 2.0 dl/g, particularly preferably from 0.45 to 1.5 dl/g.

The Abbe number of the polycarbonate copolymer of the present invention is preferably 50 or more, particularly preferably 55 or more. As this value is larger, the wavelength dispersion of the refractive index becomes small and, for example, in use as a single lens, chromatic aberration is reduced to facilitate obtaining a clearer image. A smaller Abbe number gives rise to a larger wavelength dispersion of the refractive index and in use as a single lens, there are caused a larger chromatic aberration and a larger blur degree of the image.

The 5% thermal reduction temperature of the polycarbonate copolymer of the present invention is preferably 340° C. or more, particularly preferably 345° C. or more. As the 5% thermal reduction temperature is larger, the thermal stability increases to enable withstanding use at a higher temperature. If this temperature becomes smaller, thermal stability decreases to hardly allow for use at a high temperature and the copolymer is difficult to produce due to a narrow control latitude at the production. In the range above, a high production temperature and a wider control latitude at the production are allowed and the production becomes easy.

The photoelastic coefficient of the polycarbonate copolymer of the present invention is preferably $40\times10^{-12}$ $Pa^{-1}$ or less, more preferably $20\times10^{-1}$ $Pa^{-1}$ or less. If the photoelastic coefficient value is high, the film produced by melt extrusion, solution casting or the like comes to have a large phase difference value and when this film is stretched, the phase difference value in the film plane is further fluctuated due to slight tension variation. In the case of laminating such a phase difference film, not only the desired phase difference is misaligned by the tension at the lamination but also the phase difference value readily changes due to shrinkage or the like of the polarizing plate after lamination. As the photoelastic coefficient is smaller, the fluctuation of phase difference is more reduced.

The polycarbonate copolymer of the present invention preferably has an Izod impact strength of 30 $J/m^2$ or more. As the Izod impact strength is larger, the molded body is increased in the strength and hardly broken.

In the polycarbonate copolymer of the present invention, the amount of the generated gas except for a phenol component (hereinafter sometimes simply referred to as the "amount of the generated gas") per unit area at 110° C. is preferably 5 $ng/cm^2$ or less. Also, the amount of the generated gas derived from a dihydroxy compound other than the dihydroxy compound represented by formula (1) is preferably 0.5 $ng/cm^2$ or less. As this amount of the generated gas is smaller, the polycarbonate copolymer is more applicable to usage requiring to avoid the effect of the generated gas, for example, usage in storing an electronic component such as semiconductor or usage as an interior material of building or as a casing for home appliances or the like.

The methods for measuring the Abbe number, 5% thermal reduction temperature, photoelastic coefficient, Izod impact strength and amount of generated gas of the polycarbonate copolymer of the present invention are specifically as described later in Examples.

The polycarbonate copolymer of the present invention gives a single glass transition temperature when subjected to differential scanning calorimetry (DSC), and the polycarbonate copolymer of the present invention can be obtained as a polymer having an arbitrary glass transition temperature between about 45° C. and about 155° C. according to usage by adjusting the kinds and blending ratio of the dihydroxy compound represented by formula (1) and the alicyclic dihydroxy compound.

For example, in the usage as a film requiring flexibility, the glass transition temperature of the polycarbonate copolymer is preferably adjusted to 45° C. or more, for example, from 45 to 100° C., and in the usage as a molded body such as bottle or pack requiring heat resistance to a certain extent, the glass transition temperature of the polycarbonate copolymer is preferably adjusted to 90° C. or more, for example, from 90 to 130° C. Furthermore, when the glass transition temperature is 120° C. or more, this is suitable for the usage as a lens. That is, a lens having such a glass transition temperature is preferred, because deformation scarcely occurs even under high-temperature high-humidity conditions at a temperature of 85° C. and a relative humidity of 85% and the surface accuracy of the lens is less fluctuated.

The polycarbonate copolymer of the present invention can be produced by a generally employed polymerization method, and the polymerization method may be either a solution polymerization method using phosgene or a melt polymerization method by the reaction with a carbonic acid diester, but a melt polymerization method is preferred, where the dihydroxy compound represented by formula (1), the alicyclic dihydroxy compound and, if desired, the other dihydroxy compound are reacted with a carbonic acid diester less toxic to the environment in the presence of a polymerization catalyst.

The carbonic acid diester usually used in this melt polymerization method includes a carbonic acid diester represented by the following formula (2):

[Chem. 15]

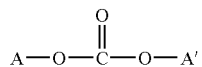
(2)

(in formula (2), A and A' each is an aliphatic group having a carbon number of 1 to 18, which may have a substituent, or an aromatic group which may have a substituent, and A and A' may be the same or different).

Examples of the carbonic acid diester represented by formula (2) include diphenyl carbonate, a substituted diphenyl carbonate as typified by ditolyl carbonate, dimethyl carbonate, diethyl carbonate, and di-tert-butyl carbonate. Among these, diphenyl carbonate and a substituted diphenyl carbonate are particularly preferred. One of these carbonic acid diesters may be used alone, or two or more thereof may be mixed and used.

The carbonic acid diester is preferably used in a molar ratio of 0.90 to 1.10, more preferably from 0.96 to 1.04, based on all dihydroxy compounds used for the reaction. If this molar ratio is less than 0.90, the terminal OH group of the produced polycarbonate copolymer is increased, as a result, the thermal stability of the polymer may be worsened or a polymer having a desired high molecular weight may not be obtained, whereas if this molar ratio exceeds 1.10, not only the rate of a transesterification reaction decreases under the same conditions or a polycarbonate copolymer having a desired molecular weight is difficult to produce but also the amount of the residual carbonic acid diester in the polycarbonate copolymer produced is increased and this residual carbonic acid diester disadvantageously gives rise to an odor at the molding or of a molded article.

The ratio in which the dihydroxy compound represented by formula (1), the alicyclic dihydroxy compound and, if desired, the other dihydroxy compound are used is the same as the ratio of constituent units derived from respective dihydroxy compounds constituting the polycarbonate copolymer of the present invention, as described above.

As for the polymerization catalyst (transesterification catalyst) in the melt polymerization, an alkali metal compound and/or an alkaline earth metal compound are used. Together with the alkali metal compound and/or alkaline earth metal compound, a basic compound such as basic boron compound, basic phosphorus compound, basic ammonium compound and amine-based compound may be subsidiarily used in combination, but it is particularly preferred to use only an alkali metal compound and/or an alkaline earth metal compound.

Examples of the alkali metal compound used as the polymerization catalyst include sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, sodium phenylborate, potassium phenylborate, lithium phenylborate, cesium phenylborate, sodium benzoate, potassium benzoate, lithium benzoate, cesium benzoate, disodium hydrogenphosphate, dipotassium hydrogenphosphate, dilithium hydrogenphosphate, dicesium hydrogenphosphate, disodium hydrogenphosphite, potassium hydrogenphosphite, dilithium hydrogenphosphite, dicesium hydrogenphosphite, disodium phenylphosphate, dipotassium phenylphosphate, dilithium phenylphosphate, dicesium phenylphosphate, alcoholate and phenolate of sodium, potassium, lithium and cesium, and disodium, dipotassium, dilithium and dicesium salts of bisphenol A.

Examples of the alkaline earth metal compound include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate.

One of these alkali metal compounds and/or alkaline earth metal compounds may be used alone, or two or more thereof may be used in combination.

Specific examples of the basic boron compound which is used in combination with the alkali metal compound and/or alkaline earth metal compound include sodium, potassium, lithium, calcium, barium, magnesium and strontium salts of tetramethylboron, tetraethylboron, tetrapropylboron, tetrabutylboron, trimethylethylboron, trimethylbenzylboron, trimethylphenylboron, triethyl-methylboron, triethylbenzylboron, triethylphenylboron, tributylbenzylboron, tributylphenylboron, tetraphenylboron, benzyltriphenylboron, methyltriphenylboron and butyl-triphenylboron.

Examples of the basic phosphorus compound include triethylphosphine, tri-n-propylphosphine, triisopropyl-phosphine, tri-n-butylphosphine, triphenylphosphine, tributylphosphine, and quaternary phosphonium salt.

Examples of the basic ammonium compound include tetramethylammonium hydroxide, tetraethylammonium hydroxide, tetrapropylammonium hydroxide, tetrabutyl-ammonium hydroxide, trimethylethylammonium hydroxide, trimethylbenzylammonium hydroxide, trimethylphenylammonium hydroxide, triethylmethyl ammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenyl ammonium hydroxide, and butyltriphenyl-ammonium hydroxide.

Examples of the amine-based compound include 4-aminopyridine, 2-aminopyridine, N,N-dimethyl-4-aminopyridine, 4-diethylamino pyridine, 2-hydroxypyridine, 2-methoxypyridine, 4-methoxypyridine, 2-dimethylamino-imidazole, 2-methoxyimidazole, imidazole, 2-mercapto-imidazole, 2-methylimidazole, and aminoquinoline.

These basic compounds may also be used alone, or two or more thereof may be used in combination.

As for the amount of the polymerization catalyst used, in the case of using an alkali metal compound and/or an alkaline earth metal compound, the polymerization catalyst is usually used, in terms of the metal, in an amount of 0.01 to 100 preferably from 0.05 to 50 μmol, more preferably from 0.1 to 10 μmol, per mol of all dihydroxy compounds used for the reaction. If the amount of the polymerization catalyst used is too small, polymerization activity necessary for producing a polycarbonate copolymer having a desired molecular weight cannot be obtained, whereas if the amount of the polymerization catalyst used is excessively large, the color hue of the obtained polycarbonate copolymer may be worsened or a by-product may be generated to cause many occurrences of reduction in flowability or production of a gel, as a result, a polycarbonate copolymer having an intended quality can be hardly produced.

In producing the polycarbonate copolymer of the present invention, the dihydroxy compound represented by formula (1) may be fed as a solid, may be heated and fed in a melted state, or may be fed in the form of an aqueous solution.

The alicyclic dihydroxy compound may also be fed as a solid, may be heated and fed in a melted state, or if soluble in water, may be fed in the form of an aqueous solution. The same applies to the other dihydroxy compound.

When such a raw material dihydroxy compound is fed in a melted state or in the form of an aqueous solution, this is advantageous in that weighing or transportation is facilitated at the industrial production.

In the present invention, the method of reacting the dihydroxy compound represented by formula (I), the alicyclic dihydroxy compound and, if desired, the other dihydroxy compound with a carbonic acid diester in the presence of a polymerization catalyst is usually performed by a multi-step process of two or more steps. Specifically, the reaction in the first step is performed at a temperature of 140 to 240° C., preferably from 150 to 220° C., for 0.1 to 10 hours, preferably from 0.5 to 3 hours. In the second and subsequent steps, the reaction temperature is elevated while gradually reducing the pressure of the reaction system from the pressure in the first step and at the same time, removing the generated phenol outside of the reaction system, and the polycondensation reaction is performed finally under a pressure in the reaction system of 200 Pa or less at a temperature of 180 to 280° C.

At the time of reducing the pressure in this polycondensation reaction, it is important to control the balance between the temperature and the pressure in the reaction system. In particular, if even either one of the temperature and the pressure is too rapidly changed, an unreacted monomer is distilled out to upset the molar ratio of the dihydroxy compound to the carbonic acid diester and the polymerization degree may decrease. For example, in the case of using isosorbide and 1,4-cyclohexanedimethanol as dihydroxy compounds, when the molar ratio of 1,4-cyclohexanedimethanol is 50 mol % or more based on all dihydroxy compounds, 1,4-cyclohexanedimethanol still as a monomer is readily distilled out. Therefore, it is preferred to perform the reaction while elevating the temperature at a temperature rise rate of 40° C. or less per hour under reduced pressure where the pressure in the reaction system is about 13 kPa, further elevate the temperature at a temperature rise rate of 40° C. or less per hour under a pressure up to about 6.67 kPa, and perform the polycondensation reaction finally under a pressure of 200 Pa or less at a temperature of 200 to 250° C., because a polycarbonate copolymer sufficiently increased in the polymerization degree is obtained.

Also, when the molar ratio of 1,4-cyclohexanedimethanol is reduced to less than 50 mol %, particularly mol % or less, based on all dihydroxy compounds, increase of viscosity abruptly occurs as compared with the case of the molar ratio of 1,4-cyclohexanedimethanol being 50 mol % or more. Therefore, it is preferred to perform the reaction while elevating the temperature at a temperature rise rate of 40° C. or less per hour until the pressure in the reaction system is reduced to about 13 kPa, further perform the reaction while elevating the temperature at a temperature rise rate of 40° C. or more per hour, preferably 50° C. or more per hour, under a pressure up to about 6.67 kPa, and perform the polycondensation reaction finally under reduced pressure of 200 Pa or less at a temperature of 200 to 280° C., because a polycarbonate copolymer sufficiently increased in the polymerization degree is obtained.

The reaction form may be a batch system, a continuous system, or a combination of batch system and continuous system.

In producing the polycarbonate copolymer of the present invention by a melt polymerization method, a phosphoric acid compound, a phosphorous acid compound, or a metal salt thereof may be added at the polymerization for the purpose of preventing coloration.

As for the phosphoric acid compound, one species or two or more species of a trialkyl phosphate such as trimethyl phosphate and triethyl phosphate are suitably used. This compound is preferably added in an amount of 0.0001 to 0.005 mol %, more preferably from 0.0003 to 0.003 mol %, based on all dihydroxy compounds used for the reaction. If the amount of the phosphorus compound added is less than the lower limit above, the effect of preventing coloration is small, whereas if it exceeds the upper limit, this may cause increase in the haze or may conversely accelerate the coloration or decrease the heat resistance.

In the case of adding a phosphorous acid compound, the compound may be arbitrarily selected from the following thermal stabilizers. In particular, one member or two or more members of trimethyl phosphite, triethyl phosphite, tris-nonylphenyl phosphite, trimethyl phosphate, tris(2,4-di-tert-butylphenyl)phosphite, bis(2,4-di-tert-butylphenyl)pentaerythritol diphosphite may be suitably used. The phosphorous acid compound is preferably added in an amount of 0.0001 to 0.005 mol %, more preferably from 0.0003 to 0.003 mol %, based on all dihydroxy compounds used for the reaction. If the amount of the phosphorous acid compound added is less than the lower limit above, the effect of preventing coloration is small, whereas if it exceeds the upper limit, this may cause increase in the haze or may conversely accelerate the coloration or decrease the heat resistance.

A phosphoric acid compound and a phosphorous acid compound or a metal salt thereof may be used in combination and in this case, the amount added is, in terms of the total amount of a phosphoric acid compound and a phosphorous acid compound or a metal salt thereof, is preferably from 0.0001 to 0.005 mol %, more preferably from 0.0003 to 0.003 mol %, based on all dihydroxy compounds described above. If the amount added is less than the lower limit above, the effect of preventing coloration is small, whereas if it exceeds the upper limit, this may cause increase in the haze or may conversely accelerate the coloration or decrease the heat resistance.

The metal salt of a phosphoric acid compound or phosphorous acid compound is preferably a zinc salt, and among zinc phosphates, a zinc long-chain alkylphosphate such as zinc stearylphosphate is preferred.

In the thus-produced polycarbonate copolymer of the present invention, a thermal stabilizer may be blended so as to prevent reduction in the molecular weight or worsening of the color hue at the molding or the like.

Examples of the thermal stabilizer include a phosphorous acid, a phosphoric acid, a phosphonous acid, a phosphonic acid, and an ester thereof. Specific examples thereof include triphenyl phosphite, tris(nonylphenyl)-phosphite, tris(2,4-di-tert-butylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearylpentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, tetrakis(2,4-di-tert-butylphenyl) 4,4'-biphenylenediphosphinate, dimethyl benzenephosphonate, diethyl benzenephosphonate, and dipropyl benzenephosphonate. Among these, preferred are tris-nonylphenyl phosphite, trimethyl phosphate, tris(2,4-di-tert-butylphenyl)phosphite, bis(2,4-di-tert-butylphenyl)pentaerythritol diphosphite, bis(2,6-di-tert-butyl-4-methylphenyl)pentaerythritol diphosphite, and dimethyl benzenephosphonate.

One of these thermal stabilizers may be used alone, or two or more thereof may be used in combination.

The thermal stabilizer may be further additionally blended in addition to the amount added at the melt polymerization. More specifically, when a polycarbonate copolymer is obtained by blending an appropriate amount of a phosphorous acid compound or phosphoric acid compound and thereafter, a phosphorous acid compound is further blended by the blending method described later, a large amount of a heat stabilizer can be blended while avoiding increase in the haze, coloration and reduction in the heat resistance at the polymerization, and the color hue can be prevented from worsening.

The blending amount of the thermal stabilizer is preferably from 0.0001 to 1 part by weight, more preferably from 0.0005 to 0.5 parts by weight, still more preferably from 0.001 to 0.2 parts by weight, per 100 parts by weight of the polycarbonate copolymer.

In the polycarbonate copolymer of the present invention, a generally known antioxidant may also be blended for the purpose of preventing oxidation.

Examples of the antioxidant include pentaerythritol tetrakis(3-mercaptopropionate), pentaerythritol tetrakis(3-laurylthiopropionate), glycerol-3-stearyl-thiopropionate, triethylene glycol-bis([3-(3-tert-butyl-5-methyl-4-hydroxyphenyl)propionate], 1,6-hexanediol-bis[3-(3,5-di-tert-butyl-4-hydroxyphenyl)propionate], penta-erythritol-tetrakis[3-(3,5-di-tert-butyl-4-hydroxyphenyl)-propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylene-bis(3,5-di-tert-butyl-4-hydroxy-hydrocinnamide), 3,5-di-tert-butyl-4-hydroxy-benzyl phosphonate-diethyl ester, tris(3,5-di-tert-butyl-4-hydroxybenzyl)isocyanurate, tetrakis(2,4-di-tert-butylphenyl)-4,4'-biphenylene diphosphinate, and 3,9-bis{1,1-dimethyl-2-[β-(3-tert-butyl-4-hydroxy-5-methylphenyl)propionyloxy]ethyl}-2,4,8,10-tetraoxaspiro(5,5)undecane. One of these antioxidants or two or more thereof may be used.

The blending amount of the antioxidant is preferably from 0.0001 to 0.5 parts by weight per 100 parts by weight of the polycarbonate.

In the polycarbonate copolymer of the present invention, for more enhancing the releasability from a mold at the melt molding, a releasing agent may also be blended within the range not impairing the purpose of the present invention.

Examples of the releasing agent include a higher fatty acid ester of a monohydric or polyhydric alcohol, a higher fatty acid, paraffin wax, beeswax, an olefin-based wax, an olefin-based wax containing a carboxy group and/or a carboxy anhydride group, silicone oil, and organo-polysiloxane.

The higher fatty acid ester is preferably a partial or full ester of a monohydric or polyhydric alcohol having a carbon number of 1 to 20 and a saturated fatty acid having a carbon number of 10 to 30. Examples of the partial or full ester of a monohydric or polyhydric alcohol and a saturated fatty acid include monoglyceride stearate, diglyceride stearate, triglyceride stearate, monosorbitate stearate, stearyl stearate, monoglyceride behenate, behenyl behenate, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitan monostearate, and 2-ethylhexyl stearate.

Among these, preferred are monoglyceride stearate, triglyceride stearate, pentaerythritol tetrastearate, and behenyl behenate.

The higher fatty acid is preferably a saturated fatty acid having a carbon number of 10 to 30. Examples of the fatty acid include myristic acid, lauric acid, palmitic acid, stearic acid, and behenic acid.

One of these releasing agents may be used alone, or two or more thereof may be mixed and used.

The blending amount of the releasing agent is preferably from 0.01 to 5 parts by weight per 100 parts by weight of the polycarbonate.

In the polycarbonate copolymer of the present invention, a light stabilizer may also be blended within the range not impairing the purpose of the present invention.

Examples of the light stabilizer include 2-(2'-hydroxy-5'-tert-octylphenyl)benzotriazole, 2-(3-tert-butyl-5-methyl-2-hydroxyphenyl)-5-chlorobenzotriazole, 2-(5-methyl-2-hydroxyphenyl)benzotriazole, 2-[2-hydroxy-3,5-bis(α,α-dimethylbenzyl)phenyl]-2H-benzotriazole, 2,2'-methylenebis(4-cumyl-6-benzotriazolephenyl), and 2,2'-p-phenylenebis(1,3-benzoxazin-4-one).

One of these light stabilizers may be used alone, or two or more thereof may be used in combination.

The blending amount of the light stabilizer is preferably from 0.01 to 2 parts by weight per 100 parts by weight of the polycarbonate copolymer.

In the polycarbonate copolymer of the present invention, a bluing agent may be blended so as to cancel the yellow tint of the lens attributable to the polymer or ultraviolet absorbent. As for the bluing agent, a bluing agent employed for polycarbonate resins may be used without any problem. In general, an anthraquinone-based dye is easily available and preferred.

Specific representative examples of the bluing agent include Solvent Violet 13, generic name [CA. No. (Color index No.) 60725], Solvent Violet 31, generic name [CA. No. 68210], Solvent Violet 33, generic name [CA. No. 60725], Solvent Blue 94, generic name [CA. No. 61500], Solvent Violet 36, generic name [CA. No. 68210], Solvent Blue 97, generic name [produced by Bayer AG, "MACROLEX VIOLET RR"], and Solvent Blue 45, generic name [CA. No. 61110].

One of these bluing agents may be used alone, or two or more thereof may be used in combination.

The bluing agent is usually blended in a ratio of $0.1 \times 10^{-4}$ to $2 \times 10^{-4}$ parts by weight per 100 parts by weight of the polycarbonate copolymer.

Examples of the method for blending various additives described above with the polycarbonate copolymer of the present invention include a method of mixing these components by a tumbler, a V-blender, a super mixer, Nauta Mixer, a Banbury mixer, a kneading roll or an extruder, and a solution blending method of mixing respective components in a state of being dissolved in a common good solvent such as methylene chloride, but the method is not particularly limited and any method may be used as long as it is a generally employed polymer blending method.

The thus-obtained polycarbonate copolymer of the present invention or the polycarbonate copolymer composition prepared by adding various additives thereto can be formed into a molded product by a generally known method such as injection molding method, extrusion molding method or compression molding method, directly or after once prepared as pellets by a melt extruder.

In order to obtain stable releasability and physical properties by increasing the miscibility of the polycarbonate copolymer of the present invention, a single-screw extruder or a twin-screw extruder is preferably used in the melt extrusion. The method using a single-screw extruder or a twin-screw extruder does not use a solvent or the like, less imposes a load on the environment and can be suitably used also in view of productivity.

The melt kneading temperature of the extruder depends on the glass transition temperature of the polycarbonate copolymer of the present invention, and when the glass transition temperature of the polycarbonate copolymer of the present invention is less than 90° C., the melt kneading temperature of the extruder is usually from 130 to 250° C., preferably from 150 to 240° C. If the melt kneading temperature is less than 130° C., the melt viscosity of the polycarbonate copolymer is high to impose a large load on the extruder and the productivity decreases, whereas if it exceeds 250° C., the melt viscosity of the polycarbonate copolymer is low and preparation of pellets becomes difficult, as a result, the productivity decreases.

Also, when the glass transition temperature of the polycarbonate copolymer of the present invention is 90° C. or more, the melt kneading temperature of the extruder is usually from 200 to 300° C., preferably from 220 to 260° C. If the melt kneading temperature is less than 200° C., the melt viscosity of the polycarbonate copolymer is high to impose a large load on the extruder and the productivity decreases, whereas if it exceeds 300° C., the polycarbonate copolymer readily deteriorates and may undergo yellowing or the molecular weight decreases to cause deterioration of the strength.

In the case of using an extruder, a filter is preferably disposed so as to prevent burning of the polycarbonate copolymer or intermingling of foreign matters at the extrusion. The pore size (opening) of the filter for removing foreign matters varies depending on the required optical accuracy but is preferably 100 μm or less. In particular, when it is required to avoid intermingling of foreign matters, the size is more preferably 40 μm or less, still more preferably 10 μm or less.

The extrusion of the polycarbonate copolymer is preferably performed in a clean room so as to prevent intermingling of foreign matters after the extrusion.

At the time of cooling and chipping the extruded polycarbonate copolymer, a cooling method such as air cooling or water cooling is preferably used. As for the air used in air cooling, air after previously removing foreign materials in the air through a hepafilter or the like is preferably used to prevent reattachment of foreign matters in air. In the case of using water cooling, water after removing metal portions in the water by an ion-exchange resin or the like and further removing foreign matters in the water through a filter is preferably used. The filter used may have various pore sizes (openings), but a filter of 10 to 0.45 μm is preferred.

In shaping a lens by using the polycarbonate copolymer of the present invention, an injection molding machine or an injection compression molding machine is suitably used and as for the molding conditions, a mold surface temperature and a resin temperature are particularly important. These molding conditions vary depending on the composition, polymerization degree or the like of the polycarbonate copolymer and cannot be indiscriminately specified, but the mold surface temperature is preferably from 30 to 170° C. and at this time, the resin temperature is preferably set to be from 220 to 290° C. If the mold surface temperature is 30° C. or less, both flowability and transferability of the resin are bad and due to stress-strain remaining at the injection molding, the birefringence tends to become large, whereas if the mold temperature is 170° C. or more, deformation readily occurs at releasing, despite good transferability. Also, if the resin temperature is 290° C. or more, decomposition of the resin readily occurs, giving rise to reduction in the strength or coloration of the molded article. Furthermore, the molding cycle is prolonged and this is not profitable.

In the case of shaping an optical material or an optical component from the polycarbonate copolymer of the present invention, the raw material charging step, the polymerization step, and the step of forming the obtained copolymer into a pellet or a sheet by extruding it in a cooling medium are preferably performed with care not to allow for entering of dusts and the like. The cleanliness is usually class 1,000 or less in shaping a normal compact disc, and further class 100 or less when the disc is for high-level information recording.

The polycarbonate copolymer of the present invention may also be used as a polymer alloy by kneading it with, for example, a synthetic resin such as aromatic polycarbonate, aromatic polyester, aliphatic polyester, polyamide, polystyrene, polyolefin, acryl, amorphous polyolefin, ABS and AS, a biodegradable resin such as polylactic acid and polybutylene succinate, or rubber.

The present invention is described in greater detail below by referring to Examples, but the present invention is not limited to the following Examples as long as the gist of the invention is observed.

In Examples below, the physical properties or characteristics of the polycarbonate copolymer were evaluated by the following methods.

(1) Refractive Index and Abbe Number

The refractive index, nC, nD, ne and nF at each wavelength were measured by an Abbe refractometer ("DR-M4" manufactured by Atago Co., Ltd.) by using an interference filter at a wavelength of 656 nm (C line), 589 nm (d line), 546 nm (e line) or 486 nm (F line).

A sample for measurement was prepared by press-molding a resin at a temperature of 160 to 200° C. to produce a film having a thickness of 80 to 500 μm and cutting the obtained film into a rectangular form having a width of about 8 mm and a length of 10 to 40 mm, and this sample was used as the test specimen for measurement.

The measurement was performed at 20° C. by using 1-bromonaphthalene as the interfacial solution.

The Abbe number νd was calculated according to the following formula:

$$\nu d = (1-nD)/(nC-nF)$$

As the Abbe number is larger, the wavelength dependency of the refractive index is smaller and, for example, in use as a single lens, the displacement of the focus point depending on the wavelength is reduced.

(2) Glass Transition Temperature (Tig)

Using a differential scanning calorimeter ("DSC822" manufactured by Mettler), about 10 mg of the sample was heated at a temperature rise rate of 10° C./min and measured to determine an extrapolation glass transition initiating temperature Tig according to JIS K 7121 (1987), which is a temperature at an intersection between a straight line drawn by extending the base line on the low temperature side to the high temperature side and a broken line drawn on points of giving a maximum gradient of the curve in the portion having a stepwise change of glass transition.

(3) Color

The chip color was measured using a color meter ("300A", manufactured by Nippon Denshoku Industries Co., Ltd.). A predetermined amount of chips were charged into a glass cell and measured by reflection measurement, and the b value was determined. As this numerical value is closer to 0, the yellow tint is weaker.

(4) Reduced Viscosity

In an automatic viscometer Model DT-504 manufactured by Chuo Rika using a Ubbelohde viscometer, a 1:1 mixed solvent of phenol and 1,1,2,2-tetrachloroethane was used as the solvent and the measurement was performed at a temperature of $20.0°$ C.$\pm0.1°$ C. The concentration was precisely adjusted to 1.00 g/dl.

The sample was dissolved over 30 minutes with stirring at $120°$ C. and after cooling, used for the measurement. From the transit time t0 of solvent and the transit time t of solution, the relative viscosity $\eta rel$ was calculated:

$$\eta rel = t/t0 \ (g \cdot cm^{-1} \cdot sec^{-1})$$

and from the relative viscosity $\eta rel$, the specific viscosity $\eta sp$ was determined:

$$\eta sp = (\eta - \eta 0)/\eta 0 = \eta rel - 1$$

The reduced viscosity (converted viscosity) $\eta red$ was determined by dividing the specific viscosity $\eta sp$ by the concentration c g/dl:

$$\eta red = \eta sp/c$$

As this numerical value is larger, the molecular weight is higher.

(5) 5% Thermal Reduction Temperature

Using "TG-DTA" (SSC-5200, TG/DTA220) manufactured by Seiko Instruments & Electronics Ltd., 10 mg of the sample was placed on an aluminum-made vessel and measured in a range from 30 to $450°$ C. at a temperature rise rate of $10°$ C./min in an nitrogen atmosphere (flow rate of nitrogen: 200 ml/min), and the temperature at which the weight was 5% reduced was determined.

As this temperature is higher, thermal decomposition less occurs.

(6) Izod Impact Strength

A test specimen having a length of 31.5 mm, a width of 6.2 mm and a thickness of 3.2 mm was injection-molded at a temperature of 240 to $300°$ C. by using a minimax injection molding machine "CS-183MMX" manufactured by Custom Scientific and notched to a depth of 1.2 mm by a notching machine.

This test specimen was measured for the notched Izod impact strength at $23°$ C. by using a minimax Izod impact tester "Model CS-183TI" manufactured by Custom Scientific.

As this value is larger, the impact strength is higher and breaking less occurs.

(7) Tensile Test

A tensile test specimen having a parallel part length of 9 mm and a parallel part diameter of 1.5 mm was injection-molded at a temperature of 240 to $300°$ C. by using the injection molding machine above, and a tensile test was performed under the condition of a tensile speed of 1 cm/min by using a tensile tester "Model CS-183TE" manufactured by Custom Scientific. The elongation at yield, tensile yield strength, tensile yield modulus and elongation at break were measured.

As each numerical value is larger, the strength is higher and the elongation is longer.

(8) NMR

Using deuterated chloroform as the solvent, $^1$H-NMR was measured at a resonant frequency of 500 MHz, a flip angle of $45°$ and a measurement temperature of $25°$ C. by "Unity Inova" manufactured by Varian.

(9) Photoelastic Coefficient

<Production of Sample>

A polycarbonate resin sample (4.0 g) vacuum-dried at $80°$ C. for 5 hours was pressed by a hot press at a hot press temperature of 200 to $250°$ C. for 1 minute under the conditions of a preheating for 1 to 3 minutes and a pressure of 20 MPa by using a spacer having a width of 8 cm, a length of 8 cm and a thickness of 0.5 mm, and then the sample with the spacer was taken out and press-cooled by a water-tube cooling press under a pressure of 20 MPa for 3 minutes to produce a sheet. A sample of 5 mm in width and 20 mm in length was cut out from the sheet.

<Measurement>

The measurement was performed using an apparatus combining a birefringence measuring apparatus composed of a He—Ne laser, a polarizer, a compensation plate, an analyzer and a photodetector with a vibration-type viscoelasticity measuring apparatus (DVE-3, manufactured by Rheology) (for details, see Journal of the Society of Rheology Japan, Vol. 19, pp. 93-97 (1991)).

The sample cut out was fixed in the viscoelasticity measuring apparatus, and the storage modulus E' was measured at a room temperature of $25°$ C. at a frequency of 96 Hz. At the same time, laser light emitted was passed through the polarizer, the sample, the compensation plate and the analyzer in this order and collected in the photodetector (photodiode). With respect to the waveform at an angular frequency of $\omega$ or $2\omega$, phase difference for the amplitude and strain was determined through a lock-in amplifier, and the strain-optical coefficient O' was determined. At this time, the directions of the polarizer and the analyzer were crossing at a right angle and each was adjusted to make an angle of $\pi/4$ with the extension direction of the sample.

The photoelastic coefficient C was determined using the storage modulus E' and the strain-optical coefficient O' according to the following formula:

$$C = O'/E'$$

(10) Amount of Generated Gas

<Production of Sample>

A polycarbonate resin sample (8 g) vacuum-dried at $100°$ C. for 5 hours was pressed by a hot press at a hot press temperature of 200 to $250°$ C. for 1 minute under the conditions of a preheating for 1 to 3 minutes and a pressure of 20 MPa by using a spacer having a width of 8 cm, a length of 8 cm and a thickness of 0.5 mm, and then the sample with the spacer was taken out and press-cooled by a water-tube cooling press under a pressure of 20 MPa for 3 minutes to produce a sheet. A sample of 1 cm in width and 2 cm in length was cut out from the sheet. The thickness was 1 mm.

<Measurement>

The generated gas was measured by thermal desorption-gas chromatography/mass spectrometry (TDS-GC/MS). The measuring apparatus used was TDS2 manufactured by GERSTEL, and the measurement was performed under the conditions of a thermal desorption temperature of $250°$ C., 10 minutes and a trap temperature of $-130°$ C.

The sample was placed in a glass chamber and the gas generated at $110°$ C. for 30 minutes with helium at 60 mL/min was collected in a collection tube Tenax-TA.

Using HP6890/5973N manufactured by Agilent as the GC/MS and using HP-VOC of $0.32 \times 60$ m and 1.8 $\mu$mdf as the column, the measurement was performed, where the temperature was kept at 40° C. for 5 minutes, then elevated to 280° C. at 8° C./min, and kept at 280° C. for 25 minutes. In the measurement, helium at 1.3 mL/min was used as the carrier gas.

The gas yield was determined in terms of toluene as the total gas yield per unit area excluding phenol and phenol-derived benzaldehyde distilled out at the production.

(11) Pencil Hardness

A surface meter, TRIBOGEAR Type 14DR, manufactured by Shinto Scientific Co., Ltd. was used as the measuring apparatus, and the measurement was performed in accordance with JIS-K5600.
Load: 750 g
Measuring speed: 30 mm/min
Measuring distance: 7 mm As the pencil, UNI produced by Mitsubishi Pencil Co., Ltd. was used.

As for the pencil hardness, 4H, 3H, 2H, H, F, HB, B, 2B, 3B and 4B were used.

Measurement was performed 5 times, and the hardness one rank softer than the pencil hardness causing occurrence of scratching two or more times was used as the pencil hardness of the material measured.

(12) Quantitative Determination of Formic Acid

Isosorbide was 100-fold diluted with pure water and measured by an ion chromatograph Model DX-500 manufactured by Dionexy.

Incidentally, isosorbide used for the reaction was produced by Roquette Freres and Sanko Chemical Co., Ltd., 1,4-cyclohexanedimethanol was produced by Eastman, cesium carbonate was produced by Wako Pure Chemical Industries, Ltd., diphenyl carbonate was produced by Mitsubishi Chemical Corp., tricyclodecanedimethanol was produced by Celanese Corp., pentacyclodecanedimethanol was produced by Celanese Corp., 1,3-adamantanediol was produced by Aldrich K.K., 1,4-butanediol was produced by Mitsubishi Chemical Corp., 1,6-hexanediol was produced by Wako Pure Chemical Industries, Ltd., and 9,9-bis-(4-(2-hydroxyethoxy)phenyl)-fluorene was produced by Osaka Gas Chemicals Co., Ltd.

Also, abbreviations of the compounds used in Examples are as follows.
ISOB: isosorbide
1,4-CHDM: 1,4-cyclohexanedimethanol
TCDDM: tricyclodecanedimethanol
PCPDM: pentacyclopentadecanedimethanol
1,4-BG: 1,4-butanediol
1,6-HD: 1,6-hexanediol
BHEPF: 9,9-bis-(4-(2-hydroxyethoxy)phenyl)fluorene
BCF: 9,9-biscresolfluorene
DPC: diphenyl carbonate Example 1

Into a reaction vessel, 13.0 parts by weight (0.246 mol) of 1,4-cyclohexanedimethanol (hereinafter simply referred to as "1,4-CHDM"), 59.2 parts by weight (0.752 mol) of diphenyl carbonate (hereinafter simply referred to as "DPC") and $2.21 \times 10^{-4}$ parts by weight ($1.84 \times 10^{-6}$ mol) of cesium carbonate as a catalyst were charged per 27.7 parts by weight (0.516 mol) of isosorbide. As a first step of the reaction, these raw materials were dissolved under heating at a heating bath temperature of 150° C. while stirring, if desired, in a nitrogen atmosphere (about 15 minutes).

Subsequently, the pressure was adjusted from normal pressure to 13.3 kPa and while elevating the heating bath temperature to 190° C. over 1 hour, the generated phenol was extracted outside of the reaction vessel.

After keeping the entire reaction vessel at 190° C. for 15 minutes, as a second step, the pressure in the reaction vessel was adjusted to 6.67 kPa, the heating bath temperature was elevated to 230° C. over 15 minutes, and the generated phenol was extracted outside of the reaction vessel. With an increase in the stirring torque of the stirring machine, the temperature was elevated to 250° C. over 8 minutes, and the pressure in the reaction vessel was allowed to reach 0.200 kPa or less so as to further remove the generated phenol. After reaching a predetermined stirring torque, the reaction was completed, and the reaction product produced was extruded into water to obtain pellets of a polycarbonate copolymer.

The reduced viscosity of the obtained polycarbonate copolymer was 1.007 dl/g, the glass transition temperature Tig was 124° C., and the color b value was 8.8. These results are shown in Table 1.

This polycarbonate copolymer was molded at 245° C. and a mold temperature of 90° C. to obtain a test specimen having a length of 31.5 mm, a width of 6.2 mm and a thickness of 3.2 mm and a tensile test specimen having a parallel part length of 9 mm and a parallel part diameter of 1.5 mm. Using these test specimens, evaluation of mechanical properties was performed, as a result, the tensile yield strength was 84 MPa, the tensile yield modulus was 748 MPa, the elongation at yield was 16%, the elongation at break was 30%, and the Izod impact strength was 227 J/m$^2$. These results are shown in Table 2.

Also, when this polycarbonate copolymer was pressed at 200° C. and formed into a film having a thickness of about 200 μm, the refractive index for d line was 1.4992 and the Abbe number was 58. These results are shown in Table 3.

The 5% thermal reduction temperature of the polycarbonate copolymer in a nitrogen atmosphere was 344° C. This result is shown in Table 4.

Furthermore, the amount of the generated gas was examined, as a result, the amount of the generated gas other than the phenol component was 3.7 ng/cm$^2$ and a generated gas derived from dihydroxy compounds excluding the dihydroxy compound represented by formula (1) was not detected. These results are shown in Table 6.

FIG. 1 shows the NMR chart of this polycarbonate copolymer.

Example 2

Into a reaction vessel, 31.8 parts by weight (0.458 mol) of isosorbide, 8.7 parts by weight (0.127 mol) of 1,4-CHDM, 59.5 parts by weight (0.583 mol) of DPC and $2.22 \times 10^{-4}$ parts by weight ($1.43 \times 10^{-6}$ mol) of cesium carbonate as a catalyst were charged. As a first step of the reaction, these raw materials were dissolved under heating at a heating bath temperature of 150° C. while stirring, if desired, in a nitrogen atmosphere (about 15 minutes).

Subsequently, the pressure was adjusted from normal pressure to 13.3 kPa and while elevating the heating bath temperature to 190° C. over 1 hour, the generated phenol was extracted outside of the reaction vessel.

After keeping the entire reaction vessel at 190° C. for 15 minutes, as a second step, the pressure in the reaction vessel was adjusted to 6.67 kPa, the heating bath temperature was elevated to 240° C. over 20 minutes, and the generated phenol was extracted outside of the reaction vessel. With an increase in the stirring torque of the stirring machine, the pressure in the reaction vessel was allowed to reach 0.200 kPa or less so as to further remove the generated phenol. After reaching a predetermined stirring torque, the reaction was completed, and the reaction product produced was extruded into water to obtain pellets of a polycarbonate copolymer.

The reduced viscosity of the obtained polycarbonate copolymer was 0.757 dl/g, the glass transition temperature Tig was 133° C., and the color b value was 8.2. These results are shown in Table 1.

Also, when this polycarbonate copolymer was pressed at 200° C. and formed into a film having a thickness of about 200 μm, the refractive index for d line was 1.5004 and the Abbe number was 57. These results are shown in Table 3.

The 5% thermal reduction temperature of the polycarbonate copolymer in a nitrogen atmosphere was 343° C. This result is shown in Table 4.

Furthermore, the photoelastic coefficient was measured and found to be $20\times10^{-12}$ $Pa^{-1}$. This result is shown in Table 5 together with the value of the glass transition temperature.

Example 3

The reaction was performed in the same manner as in Example 2 except for changing the raw materials to 35.9 parts by weight (0.674 mol) of isosorbide, 4.4 parts by weight (0.083 mol) of 1,4-CHDM, 59.7 parts by weight (0.764 mol) of DPC and $2.22\times10^{-4}$ parts by weight ($1.87\times10^{-6}$ mol) of cesium carbonate as a catalyst.

The reduced viscosity of the obtained polycarbonate copolymer was 0.712 dl/g, the glass transition temperature Tig was 148° C., and the color b value was 9.1. These results are shown in Table 1.

Also, when this polycarbonate copolymer was pressed at 200° C. and formed into a film having a thickness of about 200 μm, the refractive index for d line was 1.5014 and the Abbe number was 57. These results are shown in Table 3.

Example 4

The reaction was performed in the same manner as in Example 1 except for changing the raw materials to 19.7 parts by weight (0.363 mol) of isosorbide, 21.6 parts by weight (0.404 mol) of 1,4-CHDM, 58.8 parts by weight (0.741 mol) of DPC and $2.19\times10^{-4}$ parts by weight ($1.82\times10^{-6}$ mol) of cesium carbonate as a catalyst.

The reduced viscosity of the obtained polycarbonate copolymer was 1.196 dl/g, the glass transition temperature Tig was 101° C., and the color b value was 7.7. These results are shown in Table 1.

This polycarbonate copolymer was molded at a temperature of 245° C. and a mold temperature of 80° C. to obtain a test specimen having a length of 31.5 mm, a width of 6.2 mm and a thickness of 3.2 mm and a tensile test specimen having a parallel part length of 9 mm and a parallel part diameter of 1.5 mm. Using these test specimens, evaluation of mechanical properties was performed, as a result, the tensile yield strength was 66 MPa, the tensile yield modulus was 595 MPa, the elongation at yield was 16%, the elongation at break was 27%, and the Izod impact strength was 293 $J/m^2$. These results are shown in Table 2.

Also, when this polycarbonate copolymer was pressed at 200° C. and formed into a film having a thickness of about 200 μm, the refractive index for d line was 1.4993 and the Abbe number was 61. These results are shown in Table 3.

Furthermore, the 5% thermal reduction temperature of the polycarbonate copolymer in a nitrogen atmosphere was 345° C. This result is shown in Table 4.

Example 5

Into a reaction vessel, 25.8 parts by weight (0.480 mol) of 1,4-CHDM, 58.6 parts by weight (0.734 mol) of DPC and $2.18\times10^{-4}$ parts by weight ($1.80\times10^{-6}$ mol) of cesium carbonate as a catalyst were charged per 15.7 parts by weight (0.288 mol) of isosorbide. As a first step of the reaction, these raw materials were dissolved under heating at a heating bath temperature of 150° C. while stirring, if desired, in a nitrogen atmosphere (about 15 minutes).

Subsequently, the pressure was adjusted from normal pressure to 13.3 kPa and while elevating the heating bath temperature to 190° C. over 1 hour, the generated phenol was extracted outside of the reaction vessel. After keeping at 190° C. for 30 minutes, as a second step, the pressure in the reaction vessel was adjusted to 6.67 kPa, the heating bath temperature was elevated to 240° C. over 45 minutes, and the generated phenol was extracted outside of the reaction vessel. With an increase in the stirring torque of the stirring machine, the pressure in the reaction vessel was allowed to reach 0.200 kPa or less so as to further remove the generated phenol. After reaching a predetermined stirring torque, the reaction was completed, and the reaction product produced was extruded into water to obtain pellets.

The reduced viscosity of the obtained polycarbonate copolymer was 1.186 dl/g, the glass transition temperature Tig was 89° C., and the color b value was 5.1. These results are shown in Table 1.

This polycarbonate copolymer was molded at a temperature of 245° C. and a mold temperature of 70° C. to obtain a test specimen having a length of 31.5 mm, a width of 6.2 mm and a thickness of 3.2 mm and a tensile test specimen having a parallel part length of 9 mm and a parallel part diameter of 1.5 mm. Using these test specimens, evaluation of mechanical properties was performed, as a result, the tensile yield strength was 59 MPa, the tensile yield modulus was 541 MPa, the elongation at yield was 15%, the elongation at break was 70%, and the Izod impact strength was 784 $J/m^2$. These results are shown in Table 2.

Also, when this polycarbonate copolymer was pressed at 200° C. and formed into a film having a thickness of about 200 μm, the refractive index for d line was 1.4993 and the Abbe number was 62. These results are shown in Table 3.

Example 6

The reaction was performed in the same manner as in Example 2 except for changing the raw materials to 27.7 parts by weight (0.516 mol) of isosorbide, 13.0 parts by weight (0.246 mol) of 1,4-CHDM, 59.2 parts by weight (0.752 mol) of DPC and $2.21\times10^{-4}$ parts by weight ($1.84\times10^{-6}$ mol) of cesium carbonate as a catalyst.

The reduced viscosity of the obtained polycarbonate copolymer was 0.979 dl/g, the glass transition temperature Tig was 124° C., and the color b value was 9.5. These results are shown in Table 1.

This polycarbonate copolymer was molded at a temperature of 245° C. and a mold temperature of 90° C. to obtain a test specimen having a length of 31.5 mm, a width of 6.2 mm and a thickness of 3.2 mm and a tensile test specimen having a parallel part length of 9 mm and a parallel part diameter of 1.5 mm. Using these test specimens, evaluation of mechanical properties was performed, as a result, the tensile yield strength was 78 MPa, the tensile yield modulus was 691 MPa, the elongation at yield was 16%, the elongation at break was 47%, and the Izod impact strength was 184 $J/m^2$. These results are shown in Table 2.

Also, the pencil hardness was H. This result is shown in Table 7.

Example 7

The reaction was performed in the same manner as in Example 2 except for changing the raw materials to 27.7 parts by weight (0.516 mol) of isosorbide, 13.0 parts by weight (0.246 mol) of 1,4-CHDM, 59.2 parts by weight (0.752 mol) of DPC and $8.7 \times 10^{-5}$ parts by weight ($5.9 \times 10^{-6}$ mol) of sodium hydroxide as a catalyst.

The reduced viscosity of the obtained polycarbonate copolymer was 0.965 dl/g, the glass transition temperature Tig was 123° C., and the color b value was 9.4. These results are shown in Table 1.

Example 8

The reaction was performed in the same manner as in Example 2 except for changing the raw materials to 28.2 parts by weight (0.516 mol) of isosorbide, 13.3 parts by weight (0.246 mol) of 1,4-CHDM, 58.5 parts by weight (0.730 mol) of DPC and $2.25 \times 10^{-4}$ parts by weight ($1.84 \times 10^{-6}$ mol) of cesium carbonate as a catalyst.

The reduced viscosity of the obtained polycarbonate copolymer was 0.496 dl/g, the glass transition temperature Tig was 122° C., and the color b value was 9.6. These results are shown in Table 1.

Also, the pencil hardness was H. This result is shown in Table 7.

Example 9

The reaction was performed in the same manner as in Example 2 except for changing the raw materials to 27.7 parts by weight (0.516 mol) of isosorbide, 13.0 parts by weight (0.246 mol) of 1,4-CHDM, 59.2 parts by weight (0.752 mol) of DPC and $2.21 \times 10^{-5}$ parts by weight ($1.84 \times 10^{-7}$ mol) of cesium carbonate as a catalyst.

The reduced viscosity of the obtained polycarbonate copolymer was 0.910 dl/g, the glass transition temperature Tig was 124° C., and the color b value was 9.8. These results are shown in Table 1.

Example 10

The reaction was performed in the same manner as in Example 2 except for changing the raw materials to 27.7 parts by weight (0.516 mol) of isosorbide, 13.0 parts by weight (0.246 mol) of 1,4-CHDM, 59.2 parts by weight (0.752 mol) of DPC and $2.21 \times 10^{-3}$ parts by weight ($1.84 \times 10^{-5}$ mol) of cesium carbonate as a catalyst.

The reduced viscosity of the obtained polycarbonate copolymer was 0.980 dl/g, the glass transition temperature Tig was 124° C., and the color b value was 8.3. These results are shown in Table 1.

Example 11

The reaction was performed in the same manner as in Example 2 except for changing the raw materials to 27.7 parts by weight (0.516 mol) of isosorbide, 13.0 parts by weight (0.246 mol) of 1,4-CHDM and 59.2 parts by weight (0.752 mol) of DPC and performing the polymerization by charging, together with the raw materials, 0.096 parts by weight of a thermal stabilizer "PEP-36" (bis(2,6-di-tert-butyl-4-methylphenyl)pentaerythritol diphosphite, produced by Asahi Denka Co., Ltd.) into the reaction vessel.

The reduced viscosity of the obtained polycarbonate copolymer was 0.975 dl/g, the glass transition temperature Tig was 124° C., and the color b value was 7.2. These results are shown in Table 1.

Example 12

The reaction was performed in the same manner as in Example 2 except for changing the raw materials to 19.7 parts by weight (0.363 mol) of isosorbide, 21.6 parts by weight (0.404 mol) of 1,4-CHDM, 58.8 parts by weight (0.741 mol) of DPC and $2.19 \times 10^{-4}$ parts by weight ($1.82 \times 10^{-6}$ mol) of cesium carbonate as a catalyst and performing the polymerization by charging, together with the raw materials, 0.096 parts by weight of a thermal stabilizer "PEP-36" (bis(2,6-di-tert-butyl-4-methylphenyl)-pentaerythritol diphosphite, produced by Asahi Denka Co., Ltd.) into the reaction vessel.

The reduced viscosity of the obtained polycarbonate copolymer was 0.850 dl/g, the glass transition temperature Tig was 100° C., and the color b value was 3.6. These results are shown in Table 1.

Comparative Example 1

Into a reaction vessel, 59.9 parts by weight (0.592 mol) of DPC and $2.23 \times 10^{-4}$ parts by weight ($1.45 \times 10^{-6}$ mol) of cesium carbonate as a catalyst were charged per 40.1 parts by weight (0.581 mol) of isosorbide. These raw materials were dissolved under heating from room temperature to 150° C. while stirring (about 15 minutes).

Subsequently, the pressure was adjusted from normal pressure to 13.3 kPa and while elevating the temperature to 190° C. over 1 hour, the generated phenol was extracted outside of the system. After keeping at 190° C. for 15 minutes, the pressure in the reaction vessel was adjusted to 6.67 kPa, the heating bath temperature was elevated to 230° C. over 15 minutes, and the generated phenol was extracted. With an increase in the stirring torque, the temperature was elevated to 250° C. over 8 minutes, and the degree of vacuum was allowed to reach 0.200 kPa or less so as to further remove the generated phenol. After reaching a predetermined stirring torque, the reaction was completed and extrusion of the reaction product into water to obtain pellets was tried, but since this failed, the reaction product was taken out in the form of a lump.

The reduced viscosity of the obtained polycarbonate copolymer was 0.679 dl/g, the glass transition temperature was 160° C., and the color b value was 13.0. The b value was high as compared with Examples and the copolymer was colored brown. These results are shown in Table 1.

This polycarbonate copolymer was molded at 265° C. by trying to sample a test specimen having a length of 31.5 mm, a width of 6.2 mm and a thickness of 3.2 mm and a tensile test specimen having a parallel part length of 9 mm and a parallel part diameter of 1.5 mm, but there were encountered problems of high melt viscosity, intense coloration, vigorous foaming and bad yield of a molded article. Using these test specimens, evaluation of mechanical properties was performed, as a result, the tensile yield strength was 105 MPa, the tensile yield modulus was 353 MPa, the elongation at yield was 17%, the elongation at break was 31%, and the Izod impact strength was 11 J/m². The Izod impact strength was found to be extremely low as compared with Examples. These results are shown in Table 2.

The 5% thermal reduction temperature of the polycarbonate copolymer in a nitrogen atmosphere was 339° C. and was found to be low as compared with Examples. This result is shown in Table 4.

Also, this polycarbonate copolymer was pressed at 200° C. to obtain a film having a thickness of about 200 μm. The obtained film was cracked when cut with scissors and brittle.

Comparative Example 2

Into a reaction vessel, 42.3 parts by weight (0.776 mol) of 1,4-CHDM, 57.7 parts by weight (0.712 mol) of DPC and 2.15×10⁻⁴ parts by weight (1.75×10⁻⁶ mol) of cesium carbonate as a catalyst were charged. As a first step of the reaction, these raw materials were dissolved under heating at a heating bath temperature of 150° C. while stirring, if desired, in a nitrogen atmosphere (about 15 minutes).

Subsequently, the pressure was reduced from normal pressure to 13.3 kPa over 3 minutes and this pressure was kept. While elevating the heating bath temperature to 190° C. over 60 minutes, the generated phenol was extracted outside of the reaction vessel.

After keeping the entire reaction vessel at 190° C. for 15 minutes, as a second step, the pressure in the reaction vessel was adjusted to 6.67 kPa, the heating bath temperature was elevated to 220° C. over 45 minutes, and the generated phenol was extracted out of the reaction vessel. With an increase in the stirring torque of the stirring machine, the pressure in the reaction vessel was allowed to reach 0.200 kPa or less so as to further remove the generated phenol. After reaching a predetermined stirring torque, the reaction was completed and the reaction product produced was extruded into water to obtain pellets of a polycarbonate copolymer.

The reduced viscosity of the obtained polycarbonate copolymer was 0.662 dl/g, the glass transition temperature was 40° C., and the color b value was 4.5. Because of the low glass transition temperature, the pellets aggregated together and could be hardly chipped. These results are shown in Table 1.

Comparative Example 3

A commercially available aromatic polycarbonate resin "Iupilon H4000" (produced by Mitsubishi Engineering-Plastics Corporation, reduced viscosity: 0.456 dl/g) was molded at 280° C. to obtain a test specimen having a length of 31.5 mm, a width of 6.2 mm and a thickness of 3.2 mm and a tensile test specimen having a parallel part length of 9 mm and a parallel part diameter of 1.5 mm.

Using these test specimens, evaluation of mechanical properties was performed, as a result, the tensile yield strength was 63 MPa, the tensile yield modulus was 629 MPa, the elongation at yield was 13%, the elongation at break was 74%, and the Izod impact strength was 6 J/m². These results are shown in Table 2.

Also, this aromatic polycarbonate resin was pressed at 200° C. to obtain a film having a thickness of about 200 μm. The refractive index for d line was 1.5828 and the Abbe number was 30. These results are shown in Table 3.

Furthermore, the photoelastic coefficient was measured and found to be 72×10⁻¹² Pa⁻¹. This result is shown in Table 5 together with the value of the glass transition temperature.

In addition, the pencil hardness was 2B. This result is shown in Table 7.

Comparative Example 4

A commercially available aromatic polycarbonate resin "Iupilon S2000" (produced by Mitsubishi Engineering-Plastics Corporation, reduced viscosity: 0.507 dl/g) was molded at 280° C. to obtain a test specimen having a length of 31.5 mm, a width of 6.2 mm and a thickness of 3.2 mm and a tensile test specimen having a parallel part length of 9 mm and a parallel part diameter of 1.5 mm.

Using these test specimens, evaluation of mechanical properties was performed, as a result, the tensile yield strength was 63 MPa, the tensile yield modulus was 565 MPa, the elongation at yield was 13%, the elongation at break was 85%, and the Izod impact strength was as high as 641 J/m². These results are shown in Table 2.

Comparative Example 5

With respect to a commercially available polylactic acid "RACEA H-440" (produced by Mitsui Chemicals, Inc.), the 5% thermal reduction temperature in a nitrogen atmosphere was measured and found to be 320° C. This result is shown in Table 4.

Example 13

Into a reaction vessel, 15.8 parts by weight (0.211 mol) of tricyclodecanedimethanol (hereinafter simply referred to as "TCDDM"), 57.4 parts by weight (0.709 mol) of DPC and 2.14×10⁻⁴ parts by weight (1.73×10⁻⁶ mol) of cesium carbonate as a catalyst were charged per 26.9 parts by weight (0.483 mol) of isosorbide. As a first step of the reaction, these raw materials were dissolved under heating at a heating bath temperature of 150° C. while stirring, if desired, in a nitrogen atmosphere (about 15 minutes).

Subsequently, the pressure was reduced from normal pressure to 13.3 kPa over 40 minutes and while elevating the heating bath temperature to 190° C. over 40 minutes, the generated phenol was extracted outside of the reaction vessel.

After keeping the entire reaction vessel at 190° C. for 15 minutes, as a second step, the heating bath temperature was elevated to 220° C. over 30 minutes. Furthermore, 10 minutes after the start of temperature rise, the pressure in the reaction vessel was adjusted to 0.200 kPa or less over 30 minutes, and the generated phenol was distilled out. After reaching a predetermined stirring torque, the reaction was completed, and the reaction product produced was extruded into water to obtain pellets of a polycarbonate copolymer.

The reduced viscosity of the obtained polycarbonate copolymer was 0.640 dl/g, the glass transition temperature Tig was 126° C., and the color b value was 4.6. These results are shown in Table 1.

This polycarbonate copolymer was molded at 245° C. and a mold temperature of 90° C. to obtain a test specimen having a length of 31.5 mm, a width of 6.2 mm and a thickness of 3.2 mm and a tensile test specimen having a parallel part length of 9 mm and a parallel part diameter of 1.5 mm. Using these test specimens, evaluation of mechanical properties was performed, as a result, the tensile yield strength was 89 MPa, the tensile yield modulus was 834 MPa, the elongation at yield was 15%, the elongation at break was 76%, and the Izod impact strength was 48 J/m². These results are shown in Table 2.

Also, when this polycarbonate copolymer was pressed at 200° C. and formed into a film having a thickness of about 200 μm, the refractive index for d line was 1.5095 and the Abbe number was 62. These results are shown in Table 3.

The 5% thermal reduction temperature of the polycarbonate copolymer in a nitrogen atmosphere was 348° C. This results is shown in Table 4.

Furthermore, the photoelastic coefficient was measured and found to be 9×10⁻¹² Pa⁻¹. This result is shown in Table 5 together with the value of the glass transition temperature.

Also, the amount of the generated gas was examined, as a result, the amount of the generated gas other than the phenol component was 4.5 ng/cm², and the generated gas derived from dihydroxy compounds excluding the dihydroxy compound represented by formula (1) was not detected. These results are shown in Table 6.

In addition, the pencil hardness was F. This result is shown in Table 7.

Example 14

The reaction was performed in the same manner as in Example 13 except for changing the raw materials to 5.4 parts by weight (0.075 mol) of TCDDM, 59.0 parts by weight (0.748 mol) of DPC and 2.20×10$^{-4}$ parts by weight (1.83× 10$^{-6}$ mol) of cesium carbonate as a catalyst per 35.5 parts by weight (0.660 mol) of isosorbide.

The reduced viscosity of the obtained polycarbonate copolymer was 0.546 dl/g, the glass transition temperature Tig was 144° C., and the color b value was 6.4. These results are shown in Table 1.

Evaluation of mechanical properties was performed, as a result, the tensile yield strength was 106 MPa, the tensile yield modulus was 872 MPa, the elongation at yield was 16%, the elongation at break was 26%, and the Izod impact strength was 65 J/m$^2$. These results are shown in Table 2.

Also, when formed into a film, the refractive index for d line was 1.5052, and the Abbe number was 60. These results are shown in Table 3.

Example 15

The reaction was performed in the same manner as in Example 13 except for changing the raw materials to 10.7 parts by weight (0.145 mol) of TCDDM, 58.2 parts by weight (0.725 mol) of DPC and 2.17×10$^{-4}$ parts by weight (1.78× 10$^{-6}$ mol) of cesium carbonate as a catalyst per 31.1 parts by weight (0.569 mol) of isosorbide.

The reduced viscosity of the obtained polycarbonate copolymer was 0.644 dl/g, the glass transition temperature Tig was 136° C., and the color b value was 2.8. These results are shown in Table 1.

Evaluation of mechanical properties was performed, as a result, the tensile yield strength was 107 MPa, the tensile yield modulus was 934 MPa, the elongation at yield was 16%, the elongation at break was 39%, and the Izod impact strength was 58 J/m$^2$. These results are shown in Table 2.

Also, when formed into a film, the refractive index for d line was 1.5090, and the Abbe number was 61. These results are shown in Table 3.

Furthermore, the 5% thermal reduction temperature of the polycarbonate copolymer in a nitrogen atmosphere was 344° C. This result is shown in Table 4.

Example 16

The reaction was performed in the same manner as in Example 13 except for changing the raw materials to 20.7 parts by weight (0.274 mol) of TCDDM, 56.6 parts by weight (0.684 mol) of DPC and 2.11×10$^{-4}$ parts by weight (1.68× 10$^{-6}$ mol) of cesium carbonate as a catalyst per 22.7 parts by weight (0.403 mol) of isosorbide.

The reduced viscosity of the obtained polycarbonate copolymer was 0.637 dl/g, the glass transition temperature Tig was 118° C., and the color b value was 2.3. These results are shown in Table 1.

Also, when formed into a film, the refractive index for d line was 1.5135, and the Abbe number was 58. These results are shown in Table 3.

Furthermore, the photoelastic coefficient was measured and found to be 7×10$^{-12}$ Pa$^{-1}$. This result is shown in Table 5 together with the value of the glass transition temperature.

Example 17

The reaction was performed in the same manner as in Example 13 except for changing the raw materials to 25.6 parts by weight (0.333 mol) of TCDDM, 55.8 parts by weight (0.666 mol) of DPC and 2.08×10$^{-4}$ parts by weight (1.63× 10$^{-6}$ mol) of cesium carbonate as a catalyst per 18.7 parts by weight (0.327 mol) of isosorbide.

The reduced viscosity of the obtained polycarbonate copolymer was 0.785 dl/g, the glass transition temperature Tig was 110° C., and the color b value was 4.7. These results are shown in Table 1.

Evaluation of mechanical properties was performed, as a result, the tensile yield strength was 79 MPa, the tensile yield modulus was 807 MPa, the elongation at yield was 13%, the elongation at break was 18%, and the Izod impact strength was 58 J/m$^2$. These results are shown in Table 2.

Also, when formed into a film, the refractive index for d line was 1.5157, and the Abbe number was 60. These results are shown in Table 3.

Furthermore, the 5% thermal reduction temperature of the polycarbonate copolymer in a nitrogen atmosphere was 349° C. This result is shown in Table 4.

Example 18

As a first step of the reaction, 30.3 parts by weight (0.394 mol) of TCDDM, 55.0 parts by weight (0.656 mol) of DPC and 2.05×10$^{-4}$ parts by weight (1.61×10$^{-6}$ mol) of cesium carbonate as a catalyst per 14.7 parts by weight (0.257 mol) of isosorbide were heated at a heating bath temperature of 150° C. while stirring, if desired, in a nitrogen atmosphere, thereby dissolving the raw materials (about 15 minutes).

Subsequently, the pressure was reduced from normal pressure to 13.3 kPa over 3 minutes and while elevating the heating bath temperature to 190° C. over 60 minutes, the generated phenol was extracted outside of the reaction vessel.

After keeping the entire reaction vessel at 190° C. for 15 minutes, as a second step, the pressure in the reaction vessel was adjusted to 6.67 kPa, the heating bath temperature was elevated to 240° C. over 45 minutes, and the generated phenol was extracted outside of the reaction vessel. Furthermore, the pressure in the reaction vessel was allowed to reach 0.200 kPa or less so as to remove the generated phenol. After reaching a predetermined stirring torque, the reaction was completed, and the reaction product produced was extruded into water to obtain pellets of a polycarbonate copolymer.

The reduced viscosity of the obtained polycarbonate copolymer was 0.672 dl/g, the glass transition temperature Tig was 102° C., and the color b value was 9.2. These results are shown in Table 1.

Evaluation of mechanical properties was performed, as a result, the tensile yield strength was 76 MPa, the tensile yield modulus was 850 MPa, the elongation at yield was 12%, the elongation at break was 31%, and the Izod impact strength was 40 J/m$^2$. These results are shown in Table 2.

Also, when formed into a film, the refractive index for d line was 1.5185 and the Abbe number was 58. These results are shown in Table 3.

The 5% thermal reduction temperature of the polycarbonate copolymer in a nitrogen atmosphere was 352° C. This results is shown in Table 4.

Comparative Example 6

Into a reaction vessel, 47.8 parts by weight (0.586 mol) of TCDDM, 58.2 parts by weight (0.585 mol) of DPC and 1.95×10$^{-4}$ parts by weight (1.44×10$^{-6}$ mol) of cesium carbonate as a catalyst were charged. As a first step of the reaction, these raw materials were dissolved under heating at a heating bath temperature of 150° C. while stirring, if desired, in a nitrogen atmosphere (about 15 minutes).

Subsequently, while reducing the pressure from normal pressure to 13.3 kPa over 40 minutes, the heating bath temperature was elevated to 190° C. over 40 minutes. The generated phenol was extracted outside of the reaction vessel.

After keeping the entire reaction vessel at 190° C. for 15 minutes, as a second step, the heating bath temperature was elevated to 220° C. over 30 minutes. Furthermore, 10 minutes after the start of temperature rise, the pressure in the reaction vessel was adjusted to 0.200 kPa or less over 30 minutes, and the generated phenol was distilled out. After reaching a predetermined stirring torque, the reaction was completed, and the reaction product produced was extruded into water to obtain pellets of a polycarbonate copolymer.

The reduced viscosity of the obtained polycarbonate copolymer was 0.899 dl/g, the glass transition temperature was 73° C., and the color b value was 3.9. These results are shown in Table 1.

Example 19

Into a reaction vessel, 19.7 parts by weight (0.145 mol) of pentacyclopentadecanedimethanol (hereinafter simply referred to as "PCPDM"), 54.7 parts by weight (0.494 mol) of DPC and 2.04×10$^{-4}$ parts by weight (1.21×10$^{-6}$ mol) of cesium carbonate as a catalyst were charged per 25.6 parts by weight (0.339 mol) of isosorbide. As a first step of the reaction, these raw materials were dissolved under heating at a heating bath temperature of 150° C. while stirring, if desired, in a nitrogen atmosphere (about 15 minutes).

Subsequently, the pressure was reduced from normal pressure to 13.3 kPa over 40 minutes and while elevating the heating bath temperature to 220° C. over 70 minutes, the generated phenol was extracted outside of the reaction vessel.

After keeping the entire reaction vessel at 220° C. for 10 minutes, as a second step, the pressure in the reaction vessel was adjusted to 0.200 kPa or less over 30 minutes while elevating the heating bath temperature to 240° C. over 20 minutes, and the generated phenol was distilled off. After reaching a predetermined stirring torque, the reaction was completed, and the reaction product produced was extruded into water to obtain pellets of a polycarbonate copolymer.

The reduced viscosity of the obtained polycarbonate copolymer was 0.730 dl/g, the glass transition temperature Tig was 149° C., and the color b value was 8.4. These results are shown in Table 1.

Also, when this polycarbonate copolymer was pressed at 200° C. and formed into a film having a thickness of about 200 μm, the refractive index for d line was 1.5194 and the Abbe number was 60. These results are shown in Table 3.

The 5% thermal reduction temperature of the polycarbonate copolymer in a nitrogen atmosphere was 347° C. This results is shown in Table 4.

Furthermore, the photoelastic coefficient was measured and found to be 8×10$^{-12}$ Pa$^{-1}$. This result is shown in Table 5 together with the value of the glass transition temperature.

Example 20

Into a reaction vessel, 31.5 parts by weight (0.161 mol) of adamantanedimethanol, 116.8 parts by weight (0.545 mol) of DPC and 6.12×10$^{-4}$ parts by weight (4.84×10$^{-6}$ mol) of cesium carbonate as a catalyst were charged per 54.7 parts by weight (0.374 mol) of isosorbide. As a first step of the reaction, these raw materials were dissolved under heating at a heating bath temperature of 150° C. while stirring, if desired, in a nitrogen atmosphere (about 15 minutes).

Subsequently, the pressure was reduced from normal pressure to 13.3 kPa over 40 minutes and while elevating the heating bath temperature to 220° C. over 70 minutes, the generated phenol was extracted outside of the reaction vessel.

After keeping the entire reaction vessel at 220° C. for 10 minutes, as a second step, the pressure in the reaction vessel was adjusted to 0.200 kPa or less over 30 minutes while elevating the heating bath temperature to 230° C. over 20 minutes, and the generated phenol was distilled off. After reaching a predetermined stirring torque, the reaction was completed, and the reaction product produced was extruded into water to obtain pellets of a polycarbonate copolymer.

The reduced viscosity of the obtained polycarbonate copolymer was 0.409 dl/g, the glass transition temperature Tig was 125° C., and the color b value was 14.8. These results are shown in Table 1.

Example 21

The reaction was performed in the same manner as in Example 20 except for changing the raw materials to 31.7 parts by weight (0.160 mol) of bicyclohexanediol, 116.4 parts by weight (0.543 mol) of DPC and 2.04×10$^{-4}$ parts by weight (1.21×10$^{-6}$ mol) of cesium carbonate as a catalyst per 54.5 parts by weight (0.373 mol) of isosorbide.

The reduced viscosity of the obtained polycarbonate copolymer was 0.260 dl/g, the glass transition temperature Tig was 125° C., and the color b value was 8.6. These results are shown in Table 1.

Example 22

Into a reaction vessel, 30.0 parts by weight (0.428 mol) of 1,4-CHDM, 58.3 parts by weight (0.561 mol) of DPC and 2.18×10$^{-4}$ parts by weight (1.38×10$^{-6}$ mol) of cesium carbonate as a catalyst were charged per 11.7 parts by weight (0.165 mol) of isosorbide. As a first step of the reaction, these raw materials were dissolved under heating at a heating bath temperature of 150° C. while stirring, if desired, in a nitrogen atmosphere (about 15 minutes).

Subsequently, the pressure was adjusted from normal pressure to 13.3 kPa and while elevating the heating bath temperature to 190° C. over 1 hour, the generated phenol was extracted outside of the system. After keeping at 190° C. for 30 minutes, as a second step, the pressure in the reaction vessel was adjusted to 6.67 kPa, the heating bath temperature was elevated to 220° C. over 45 minutes, and the generated phenol was extracted. With an increase in the stirring torque, the pressure in the reaction vessel was allowed to reach 0.200 kPa or less so as to further remove the generated phenol. After reaching a predetermined stirring torque, the reaction was completed, and the reaction product was extruded into water to obtain pellets.

The reduced viscosity of the obtained polycarbonate copolymer was 0.979 dl/g, the glass transition temperature was 74° C., and the color b value was 4.7. These results are shown in Table 1.

Furthermore, this polycarbonate copolymer was pressed at 200° C. to obtain a film having a thickness of about 200 μm. The refractive index for d line was 1.5002, and the Abbe number was 56. These results are shown in Table 3.

Example 23

The reaction was performed in the same manner as in Example 22 except for changing the raw materials to 7.8 parts by weight (0.142 mol) of isosorbide, 34.1 parts by weight (0.631 mol) of 1,4-CHDM, 58.1 parts by weight (0.723 mol) of DPC and $2.17 \times 10^{-4}$ parts by weight ($1.77 \times 10^{-6}$ mol) of cesium carbonate as a catalyst.

The reduced viscosity of the obtained polycarbonate copolymer was 1.159 dl/g, the glass transition temperature Tig was 63° C., and the color b value was 2.9. These results are shown in Table 1.

Furthermore, this polycarbonate copolymer was pressed at 200° C. to obtain a film having a thickness of about 200 μm. The refractive index for d line was 1.5024, and the Abbe number was 56. These results are shown in Table 3.

Example 24

The reaction was performed in the same manner as in Example 22 except for changing the raw materials to 3.9 parts by weight (0.070 mol) of isosorbide, 38.2 parts by weight (0.703 mol) of 1,4-CHDM, 57.9 parts by weight (0.717 mol) of DPC and $2.16 \times 10^{-4}$ parts by weight ($1.76 \times 10^{-6}$ mol) of cesium carbonate as a catalyst.

The reduced viscosity of the obtained polycarbonate copolymer was 0.670 dl/g, the glass transition temperature Tig was 51° C., and the color b value was 2.8. These results are shown in Table 1.

Example 25

The reaction was performed in the same manner as in Example 22 except for changing the raw materials to 1.9 parts by weight (0.035 mol) of isosorbide, 40.3 parts by weight (0.740 mol) of 1,4-CHDM, 57.8 parts by weight (0.715 mol) of DPC and $2.15 \times 10^{-4}$ parts by weight ($1.75 \times 10^{-6}$ mol) of cesium carbonate as a catalyst.

The reduced viscosity of the obtained polycarbonate copolymer was 0.640 dl/g, the glass transition temperature Tig was 45° C., and the color b value was 3.0. These results are shown in Table 1.

Comparative Example 7

The reaction was performed in the same manner as in Example 13 except for changing the raw materials to 85.61 parts by weight (0.585 mol) of isosorbide, 22.6 parts by weight (0.251 mol) of 1,4-butanediol (hereinafter simply referred to as "1,4-BG"), 166.8 parts by weight (0.779 mol) of DPC and $1.08 \times 10^{-4}$ parts by weight ($0.87 \times 10^{-6}$ mol) of cesium carbonate as a catalyst.

The reduced viscosity of the obtained polycarbonate copolymer was 0.568 dl/g, the glass transition temperature was 116° C., and the color b value was 12.4. These results are shown in Table 1.

Also, the photoelastic coefficient was measured and found to be $23 \times 10^{-12}$ Pa$^{-1}$. This result is shown in Table 5 together with the value of the glass transition temperature.

Furthermore, the amount of the generated gas was examined, as a result, the amount of the generated gas other than the phenol component was 10.0 ng/cm$^2$, and 2.0 ng/cm$^2$ of tetrahydrofuran (THF) was detected as the generated gas derived from dihydroxy compounds excluding the dihydroxy compound represented by formula (1). These results are shown in Table 6.

Comparative Example 8

The reaction was performed in the same manner as in Example 13 except for changing the raw materials to 81.22 parts by weight (0.556 mol) of isosorbide, 28.2 parts by weight (0.239 mol) of 1,6-hexanediol (hereinafter simply referred to as "1,6-HD"), 161.6 parts by weight (0.754 mol) of DPC and $1.08 \times 10^{-4}$ parts by weight ($0.87 \times 10^{-6}$ mol) of cesium carbonate as a catalyst.

The reduced viscosity of the obtained polycarbonate copolymer was 1.063 dl/g, the glass transition temperature was 85° C., and the color b value was 8.9. These results are shown in Table 1.

Also, the photoelastic coefficient was measured and found to be $20 \times 10^{-12}$ Pa$^{-1}$. This result is shown in Table 5 together with the value of the glass transition temperature.

Furthermore, the amount of the generated gas was examined, as a result, the amount of the generated gas other than the phenol component was 11.0 ng/cm$^2$, and 5.6 ng/cm$^2$ of cyclohexadiene and cyclohexyl phenyl ether was detected as the generated gas derived from dihydroxy compounds excluding the dihydroxy compound represented by formula (1). These results are shown in Table 6.

In addition, the pencil hardness was HB. This result is shown in Table 7.

Comparative Example 9

The reaction was performed in the same manner as in Example 7 except for changing the raw materials to 42.6 parts by weight (0.292 mol) of isosorbide, 25.6 parts by weight (0.130 mol) of TCDDM, 46.7 parts by weight (0.106 mol) of 9,9-bis-(4-(2-hydroxyethoxy)phenyl)fluorene (hereinafter simply referred to as "BHEPF"), 127.6 parts by weight (0.596 mol) of DPC and $8.7 \times 10^{-5}$ parts by weight ($5.9 \times 10^{-6}$ mol) of sodium hydroxide as a catalyst.

The reduced viscosity of the obtained polycarbonate copolymer was 0.659 dl/g, the glass transition temperature was 121° C., and the color b value was 9.2. These results are shown in Table 1.

Furthermore, this polycarbonate copolymer was pressed at 200° C. to obtain a film having a thickness of 200 μm. The refractive index for d line was 1.5410, and the Abbe number was 42. These results are shown in Table 3.

Comparative Example 10

The reaction was performed in the same manner as in Example 13 except for changing the raw materials to 63.84 parts by weight (0.437 mol) of isosorbide, 27.6 parts by weight (0.0729 mol) of 9,9-biscresolfluorene (hereinafter simply referred to as "BCF"), 19.7 parts by weight (0.219 mol) of 1,4-butanediol and $1.08 \times 10^{-4}$ parts by weight ($0.87 \times 10^{-6}$ mol) of cesium carbonate as a catalyst.

The reduced viscosity of the obtained polycarbonate copolymer was 0.464 dl/g, the glass transition temperature was 129° C., and the color b value was 8.3. These results are shown in Table 1.

Also, the photoelastic coefficient was measured and found to be $23 \times 10^{-12}$ Pa$^{-1}$. This result is shown in Table 5 together with the value of the glass transition temperature.

Example 26

Into a reaction vessel, 15.4 parts by weight (8.02 mol) of TCDDM, 57.7 parts by weight (26.72 mol) of DPC and $2.14 \times 10^{-4}$ parts by weight ($6.68 \times 10^{-5}$ mol) of cesium carbonate as a catalyst were charged per 26.8 parts by weight (18.70 mol) of isosorbide. As a first step of the reaction, these raw materials were dissolved under heating at a heating bath temperature of 150° C. while stirring, if desired, in a nitrogen atmosphere (about 60 minutes).

Subsequently, the pressure was reduced from normal pressure to 13.3 kPa over 40 minutes and while elevating the heating bath temperature to 190° C. over 40 minutes, the generated phenol was extracted outside of the reaction vessel.

After keeping the entire reaction vessel at 190° C. for 15 minutes, as a second step, the heating bath temperature was elevated to 220° C. over 30 minutes, and 10 minutes after the temperature reached 220° C., the pressure in the reaction vessel adjusted to 0.200 kPa or less over minutes to distill out the generated phenol. After reaching a predetermined stirring torque, the reaction was completed, and the reaction product produced was extruded into water to obtain pellets of a polycarbonate copolymer.

The reduced viscosity of the obtained polycarbonate copolymer was 0.506 dl/g, the glass transition temperature Tig was 126° C., and the color b value was 10.0. These results are shown in Table 8.

Figure 2:
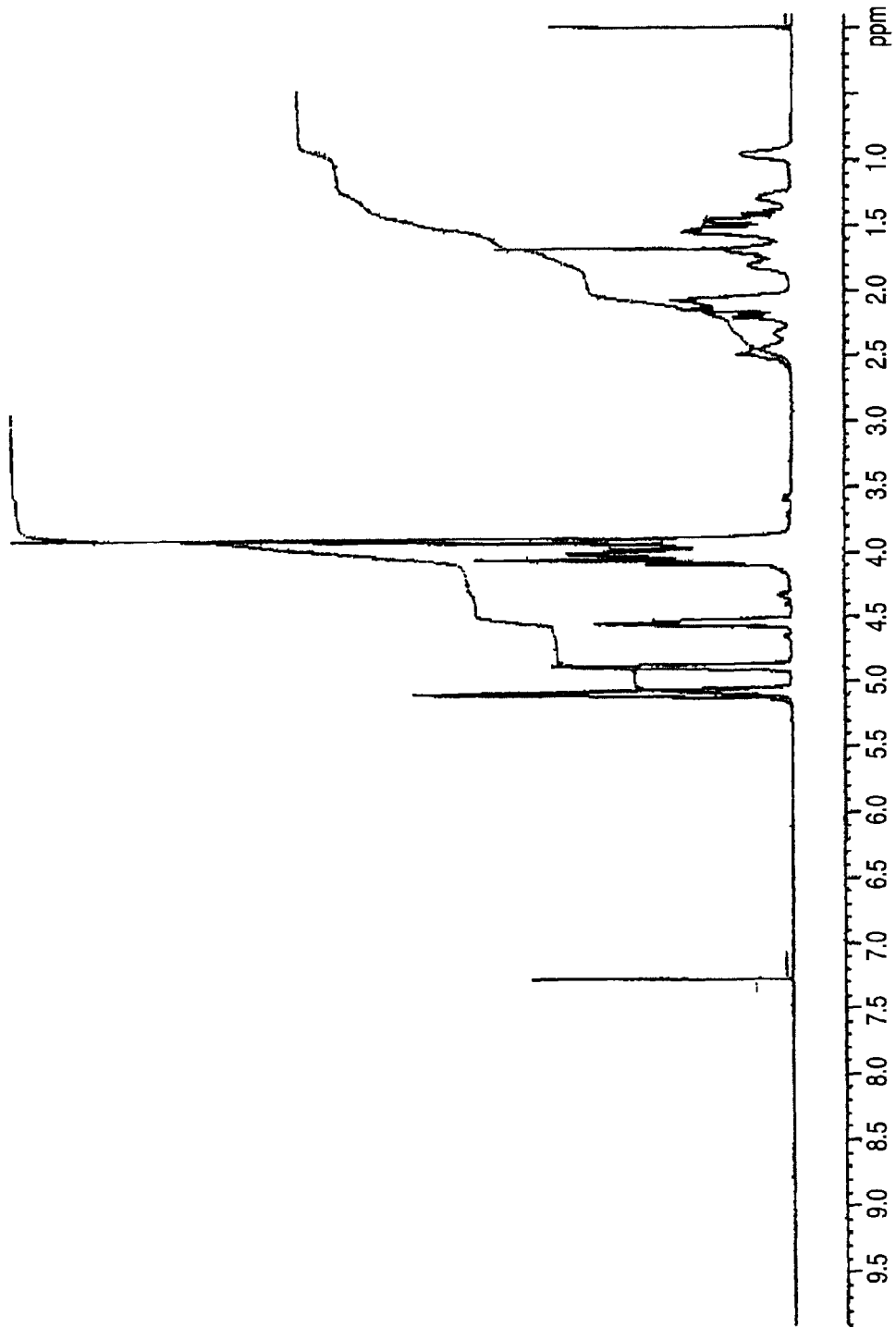
FIG. 2 is a view showing an NMR chart of the polycarbonate copolymer produced in Example 26.

Also, FIG. 2 shows the NMR chart of this polycarbonate copolymer.

Example 27

The reaction was performed in the same manner as in Example 26 except for changing the raw materials to 12.7 parts by weight (9.47 mol) of CHDM, 60.4 parts by weight (30.39 mol) of DPC and $2.15 \times 10^{-4}$ parts by weight ($7.10 \times 10^{-5}$ mol) of cesium carbonate as a catalyst per 26.9 parts by weight (19.88 mol) of isosorbide. The reduced viscosity of the obtained polycarbonate copolymer was 0.621 dl/g, the glass transition temperature Tig was 123° C., and the color b value was 11.0. These results are shown in Table 8.

Distillation of Isosorbide:

Isosorbide (about 1.3 kg) was charged into a 2 L-volume flask in an argon stream, a Claisen tube was attached to the flask, and a receiving vessel was fixed through a fraction cutter. The parts such as pipeline each was kept warm to avoid solidification. After the initiation of gradual reduction of the pressure, when the system was heated, the compound was dissolved at an inner temperature of about 100° C. and thereafter, started distilling out at an inner temperature of 160° C. At this time, the pressure was at 133 to 266 Pa. The initial distillate was removed and then, distillation was performed at an inner temperature of 160 to 170° C., a top temperature of 150 to 157° C. and 133 Pa. After the completion of distillation, the pressure was returned to normal pressure by introducing argon. The obtained distillation product was cooled and ground under an argon stream to obtain isosorbide. This product was sealed in an aluminum-laminated bag under an argon stream and stored.

Examples 28 and 29

The reaction was performed in the same manner as in Example 13 except for using ISOB in which the formic acid content was adjusted to the amount shown in Table 8 by previously distilling ISOB.

The obtained polycarbonate copolymers each was measured for the reduced viscosity, glass transition temperature and color b value, and the results are shown in Table 8.

Examples 30 and 31

The reaction was performed in the same manner as in Example 2 except for using ISOB in which the formic acid content was adjusted to the amount shown in Table 8 by previously distilling ISOB.

The obtained polycarbonate copolymers each was measured for the reduced viscosity, glass transition temperature and color b value, and the results are shown in Table 8.

Reference Examples 1 to 3

The reaction was performed in the same manner as in Example 13 except for using ISOB in which the formic acid content was the amount shown in Table 8 without previously distilling ISOB.

Phenol was distilled out, but the reaction solution was gradually colored, an increase in the torque was not observed, and a polymer was not obtained.

Reference Example 4

The reaction was performed in the same manner as in Example 2 except for using ISOB in which the formic acid content was the amount shown in Table 8 without previously distilling ISOB.

Phenol was distilled out, but the reaction solution was gradually colored, an increase in the torque was not observed, and a polymer was not obtained.

TABLE 1

| | Charge Parts by Weight | | | | Charge Molar Ratio | | |
|---|---|---|---|---|---|---|---|
| | | Dihydroxy Compounds Other Than ISOB | | | | Dihydroxy | Ratio of DPC to |
| | ISOB (parts by weight) | kind | parts by weight | DPC (parts by weight) | ISOB | Compounds Other than ISOB | All Dihydroxy Compounds |
| Example 1 | 27.7 | 1,4-CHDM | 13.0 | 59.2 | 0.68 | 0.32 | 0.99 |
| Example 2 | 31.8 | 1,4-CHDM | 8.7 | 59.5 | 0.78 | 0.22 | 1.00 |
| Example 3 | 35.9 | 1,4-CHDM | 4.4 | 59.7 | 0.89 | 0.11 | 1.01 |
| Example 4 | 19.7 | 1,4-CHDM | 21.6 | 58.8 | 0.47 | 0.53 | 0.97 |
| Example 5 | 15.7 | 1,4-CHDM | 25.8 | 58.6 | 0.37 | 0.63 | 0.96 |
| Example 6 | 27.7 | 1,4-CHDM | 13.0 | 59.2 | 0.68 | 0.32 | 0.99 |
| Example 7 | 27.7 | 1,4-CHDM | 13.0 | 59.2 | 0.68 | 0.32 | 0.99 |
| Example 8 | 28.2 | 1,4-CHDM | 13.3 | 58.5 | 0.68 | 0.32 | 0.96 |
| Example 9 | 27.7 | 1,4-CHDM | 13.0 | 59.2 | 0.68 | 0.32 | 0.99 |
| Example 10 | 27.7 | 1,4-CHDM | 13.0 | 59.2 | 0.68 | 0.32 | 0.99 |
| Example 11 | 27.7 | 1,4-CHDM | 13.0 | 59.2 | 0.68 | 0.32 | 0.99 |
| Example 12 | 19.7 | 1,4-CHDM | 21.6 | 58.8 | 0.47 | 0.53 | 0.97 |
| Example 13 | 26.9 | TCDDM | 15.8 | 57.4 | 0.7 | 0.3 | 1.01 |

TABLE 1-continued

| | | | | | | | |
|---|---|---|---|---|---|---|---|
| Example 14 | 35.5 | TCDDM | 5.4 | 59.0 | 0.9 | 0.1 | 1.02 |
| Example 15 | 31.1 | TCDDM | 10.7 | 58.2 | 0.8 | 0.2 | 1.02 |
| Example 16 | 22.7 | TCDDM | 20.7 | 56.6 | 0.6 | 0.4 | 1.00 |
| Example 17 | 18.7 | TCDDM | 25.6 | 55.8 | 0.5 | 0.5 | 1.01 |
| Example 18 | 14.7 | TCDDM | 30.3 | 55.0 | 0.4 | 0.6 | 1.01 |
| Example 19 | 25.6 | PCPDM | 19.7 | 54.7 | 0.7 | 0.3 | 1.02 |
| Example 20 | 54.7 | adamantanedimethanol | 31.5 | 116.8 | 0.7 | 0.3 | 1.02 |
| Example 21 | 54.5 | biscyclohxanediol | 31.7 | 116.4 | 0.7 | 0.3 | 1.02 |
| Example 22 | 11.7 | 1,4-CHDM | 30.0 | 58.3 | 0.28 | 0.78 | 0.95 |
| Example 23 | 7.8 | 1,4-CHDM | 34.1 | 58.1 | 0.18 | 0.82 | 0.94 |
| Example 24 | 3.9 | 1,4-CHDM | 38.2 | 57.9 | 0.09 | 0.91 | 0.93 |
| Example 25 | 1.9 | 1,4-CHDM | 40.3 | 57.8 | 0.05 | 0.95 | 0.92 |
| Comparative Example 1 | 40.1 | — | 0.0 | 59.9 | 1.00 | 0.00 | 1.02 |
| Comparative Example 2 | 0.0 | 1,4-CHDM | 42.3 | 57.7 | 0.00 | 1.00 | 0.92 |
| Comparative Example 6 | 0.0 | TCDDM | 47.8 | 58.2 | 0.00 | 1.00 | 1.00 |
| Comparative Example 7 | 85.61 | 1,4-BG | 22.6 | 166.8 | 0.7 | 0.3 | 0.93 |
| Comparative Example 8 | 81.22 | 1,6-HD | 28.2 | 161.6 | 0.7 | 0.3 | 0.95 |
| Comparative Example 9 | 42.6 | TCDDM/BHEPF | 25.6/46.7 | 127.6 | 0.5 | 0.4/0.1 | 1.02 |
| Comparative Example 10 | 63.84 | BCF/1,4-BG | 27.6/19.7 | 145.04 | 0.6 | 0.1/0.3 | 0.93 |

| | Catalyst | | Stabilizer Note 2) | Polymerization Temperature (° C.) | Reduced Viscosity (dl/g) | Glass Transition Temperature Tig (° C.) | Color b |
|---|---|---|---|---|---|---|---|
| | kind | amount added Note 1) | | | | | |
| Example 1 | cesium carbonate | 5 | — | 250 | 1.007 | 124 | 8.8 |
| Example 2 | cesium carbonate | 5 | — | 240 | 0.757 | 133 | 8.2 |
| Example 3 | cesium carbonate | 5 | — | 240 | 0.712 | 148 | 9.1 |
| Example 4 | cesium carbonate | 5 | — | 250 | 1.196 | 101 | 7.7 |
| Example 5 | cesium carbonate | 5 | — | 240 | 1.186 | 89 | 5.1 |
| Example 6 | cesium carbonate | 5 | — | 240 | 0.979 | 124 | 9.5 |
| Example 7 | sodium hydroxide | 8 | — | 240 | 0.965 | 123 | 9.4 |
| Example 8 | cesium carbonate | 5 | — | 250 | 0.496 | 122 | 9.6 |
| Example 9 | cesium carbonate | 0.5 | — | 240 | 0.910 | 124 | 9.8 |
| Example 10 | cesium carbonate | 25 | — | 240 | 0.980 | 124 | 8.3 |
| Example 11 | cesium carbonate | 5 | PEP-36 | 240 | 0.975 | 124 | 7.2 |
| Example 12 | cesium carbonate | 5 | PEP-36 | 240 | 0.850 | 100 | 3.6 |
| Example 13 | cesium carbonate | 5 | | 220 | 0.640 | 126 | 4.6 |
| Example 14 | cesium carbonate | 5 | | 220 | 0.546 | 144 | 6.4 |
| Example 15 | cesium carbonate | 5 | | 220 | 0.644 | 136 | 2.8 |
| Example 16 | cesium carbonate | 5 | | 220 | 0.637 | 118 | 2.3 |
| Example 17 | cesium carbonate | 5 | | 220 | 0.785 | 110 | 4.7 |
| Example 18 | cesium carbonate | 5 | | 240 | 0.672 | 102 | 9.2 |
| Example 19 | cesium carbonate | 5 | | 240 | 0.730 | 149 | 8.4 |
| Example 20 | cesium carbonate | 15 | | 230 | 0.409 | 125 | 14.8 |
| Example 21 | cesium carbonate | 5 | | 230 | 0.260 | 125 | 8.6 |
| Example 22 | cesium carbonate | 5 | — | 220 | 0.979 | 74 | 4.7 |
| Example 23 | cesium carbonate | 5 | — | 220 | 1.159 | 63 | 2.9 |
| Example 24 | cesium carbonate | 5 | — | 220 | 0.670 | 51 | 2.8 |
| Example 25 | cesium carbonate | 5 | — | 220 | 0.640 | 45 | 3.0 |
| Comparative Example 1 | cesium carbonate | 5 | — | 250 | 0.679 | 160 | 13.0 |
| Comparative Example 2 | cesium carbonate | 5 | — | 220 | 0.662 | 40 | 4.5 |
| Comparative Example 6 | cesium carbonate | 5 | | 220 | 0.899 | 73 | 3.9 |
| Comparative Example 7 | Mg acetate | 2.5 | | 220 | 0.568 | 116 | 12.4 |
| Comparative Example 8 | cesium carbonate | 2.5 | | 220 | 1.063 | 85 | 8.9 |
| Comparative Example 9 | sodium hydroxide | 8 | | 240 | 0.659 | 121 | 9.2 |
| Comparative Example 10 | cesium carbonate | 2.5 | | 220 | 0.464 | 129 | 8.3 |

Note 1) Molar number (unit: μmol) as metal per mol of all dihydroxy compounds.
Note 2) Amount of PEP-36 added: 0.096 parts by weight in Examples 15 and 16.

TABLE 2

| | Charge Molar Ratio of Dihydroxy Compounds | | | Reduced Viscosity | Tensile Yield Strength | Tensile Yield Modulus | Elongation at Yield | Elongation at Break | Izod Impact Strength |
|---|---|---|---|---|---|---|---|---|---|
| | Isosorbide | 1,4-CHDM | TCDDM | (dl/g) | (MPa) | (MPa) | (%) | (%) | (J/m$^2$) |
| Example 1 | 0.68 | 0.32 | | 1.007 | 84 | 748 | 16 | 30 | 227 |
| Example 4 | 0.47 | 0.53 | | 1.196 | 66 | 595 | 16 | 27 | 293 |
| Example 5 | 0.37 | 0.63 | | 1.186 | 59 | 541 | 15 | 70 | 784 |
| Example 6 | 0.68 | 0.32 | | 0.979 | 78 | 691 | 16 | 47 | 184 |
| Example 13 | 0.7 | | 0.3 | 0.640 | 89 | 834 | 15 | 76 | 48 |
| Example 14 | 0.9 | | 0.1 | 0.546 | 106 | 872 | 16 | 26 | 65 |
| Example 15 | 0.8 | | 0.2 | 0.644 | 107 | 934 | 16 | 39 | 58 |
| Example 17 | 0.5 | | 0.5 | 0.785 | 79 | 807 | 13 | 18 | 58 |

TABLE 2-continued

| | Charge Molar Ratio of Dihydroxy Compounds | | | Reduced Viscosity | Tensile Yield Strength | Tensile Yield Modulus | Elongation at Yield | Elongation at Break | Izod Impact Strength |
|---|---|---|---|---|---|---|---|---|---|
| | Isosorbide | 1,4-CHDM | TCDDM | (dl/g) | (MPa) | (MPa) | (%) | (%) | (J/m²) |
| Example 18 | 0.4 | | 0.6 | 0.672 | 76 | 850 | 12 | 31 | 40 |
| Comparative Example 1 | 1.0 | 0.0 | | 0.679 | 105 | 353 | 17 | 31 | 11 |
| Comparative Example 3 (Iupilon H4000) | — | — | | 0.456 | 63 | 629 | 13 | 74 | 6 |
| Comparative Example 4 (Iupilon S2000) | — | — | | 0.507 | 63 | 565 | 13 | 85 | 641 |

TABLE 3

| | Charge Molar Ratio of Dihydroxy Compounds | | | | Refractive Index | | | | Abbe Number |
|---|---|---|---|---|---|---|---|---|---|
| | ISOB | 1,4-CHDM | TCDDM | PCPDM | nD (589 nm) | nC (656 nm) | ne (546 nm) | nF (486 nm) | vd |
| Example 1 | 0.68 | 0.32 | | | 1.4992 | 1.4969 | 1.5015 | 1.5056 | 58 |
| Example 2 | 0.78 | 0.22 | | | 1.5004 | 1.4980 | 1.5026 | 1.5068 | 57 |
| Example 3 | 0.89 | 0.11 | | | 1.5014 | 1.4991 | 1.5037 | 1.5079 | 57 |
| Example 4 | 0.47 | 0.53 | | | 1.4993 | 1.4970 | 1.5013 | 1.5052 | 61 |
| Example 5 | 0.37 | 0.63 | | | 1.4993 | 1.4969 | 1.5014 | 1.5050 | 62 |
| Example 13 | 0.7 | | 0.3 | | 1.5095 | 1.5070 | 1.5118 | 1.5153 | 62 |
| Example 14 | 0.9 | | 0.1 | | 1.5052 | 1.5027 | 1.5073 | 1.5111 | 60 |
| Example 15 | 0.8 | | 0.2 | | 1.5090 | 1.5065 | 1.5113 | 1.5148 | 61 |
| Example 16 | 0.6 | | 0.4 | | 1.5135 | 1.5110 | 1.5158 | 1.5198 | 58 |
| Example 17 | 0.5 | | 0.5 | | 1.5157 | 1.5131 | 1.5180 | 1.5217 | 60 |
| Example 18 | 0.4 | | 0.6 | | 1.5185 | 1.5159 | 1.5209 | 1.5249 | 58 |
| Example 19 | 0.7 | | | 0.3 | 1.5194 | 1.5167 | 1.5215 | 1.5254 | 60 |
| Example 22 | 0.28 | 0.78 | | | 1.5002 | 1.4980 | 1.5026 | 1.5066 | 56 |
| Example 23 | 0.18 | 0.82 | | | 1.5024 | 1.5000 | 1.5052 | 1.5094 | 56 |
| Comparative Example 3 (Iupilon H4000) | | | | | 1.5828 | 1.5776 | 1.5879 | 1.5970 | 30 |
| Comparative Example 9 (ISB/TCDDM/BHEPF = 5/4/1) | | | | | 1.5410 | 1.5374 | 1.5443 | 1.5502 | 42 |

TABLE 4

| | Charge Molar Ratio of Dihydroxy Compounds | | | | | | 5% Weight Reduction Temperature (° C.) |
|---|---|---|---|---|---|---|---|
| | Isosorbide | 1,4-CHDM | TCDDM | PCPDM | 1,4-BG | 1,6-HD | |
| Example 1 | 0.68 | 0.32 | | | | | 344 |
| Example 2 | 0.78 | 0.22 | | | | | 343 |
| Example 4 | 0.47 | 0.53 | | | | | 345 |
| Example 13 | 0.7 | | 0.3 | | | | 348 |
| Example 15 | 0.8 | | 0.2 | | | | 344 |
| Example 17 | 0.5 | | 0.5 | | | | 349 |
| Example 18 | 0.4 | | 0.6 | | | | 352 |
| Example 19 | 0.7 | | | 0.3 | | | 347 |
| Comparative Example 1 | 1.0 | 0.0 | | | | | 339 |
| Comparative Example 5 (polylactic acid) | | | | | | | 320 |
| Comparative Example 7 (ISB/1,4-BG = 7/3) | 0.7 | | | | 0.3 | | 339 |
| Comparative Example 8 (ISB/1,6-HD = 7/3) | | | | | | 0.3 | 336 |

TABLE 5

| | Dihydroxy Compound | | Photoelastic Coefficient ($\times 10^{-12}$ Pa$^{-1}$) | Glass Transition Temperature Tig (° C.) |
|---|---|---|---|---|
| | Charge Composition | Charge Molar Ratio | | |
| Example 2 | ISB/1,4-CHDM | 0.78/0.22 | 20 | 133 |
| Example 13 | ISB/TCDDM | 0.7/0.3 | 9 | 126 |
| Example 16 | ISB/TCDDM | 0.6/0.4 | 7 | 118 |
| Example 19 | ISB/PCPDM | 0.7/0.3 | 8 | 149 |
| Comparative Example 3 | Iupilon H4000 | | 72 | 145 |
| Comparative Example 7 | ISB/1,4-BG | 0.7/0.3 | 23 | 116 |
| Comparative Example 8 | ISB/1,6-HD | 0.7/0.3 | 20 | 85 |
| Comparative Example 10 | ISOB/BG/BCF | 0.6/0.3/0.1 | 23 | 129 |

TABLE 6

| | Dihydroxy Compound | | Generation of Gas Other Than Phenol Component (ng/cm$^2$) | Amount of Generated Gas Derived From Dihydroxy Compounds Excluding Dihydroxy Compound Represented by Formula (1) (ng/cm$^2$) |
|---|---|---|---|---|
| | Charge Composition | Charge Molar Ratio | | |
| Example 1 | ISOB/CHDM | 0.68/0.32 | 3.7 | 0 |
| Example 13 | ISOB/TCDDM | 0.7/0.3 | 4.5 | 0 |
| Comparative Example 7 | ISOB/1,4-BG | 0.7/0.3 | 10.0 | 2.0[1] |
| Comparative Example 8 | ISOB/1,6-HD | 0.7/0.3 | 11.0 | 5.6[2] |

[1] THF
[2] Cyclohexadiene, cyclohexyl phenyl ether

TABLE 7

| | Charge Molar Ratio of Dihydroxy Compounds | Pencil Hardness |
|---|---|---|
| Example 6 | ISB/CHDM = 0.68/0.32 | H |
| Example 8 | ISB/CHDM = 0.68/0.32 | H |
| Example 13 | ISB/TCDDM = 0.7/0.3 | F |
| Comparative Example 3 | (Iupilon H4000) | 2B |
| Comparative Example 8 | ISB/1,6-HD = 0.7/0.3 | HB |

TABLE 8

| | Presence or Absence of Distillation of ISOB | Amount of Formic Acid in ISOB (PPM) | Reduced Viscosity (dl/g) | Glass Transition Temperature Tig (° C.) | Color b |
|---|---|---|---|---|---|
| Example 26 | none | 5 | 0.506 | 126 | 10.0 |
| Example 27 | none | 5 | 0.621 | 123 | 11.0 |
| Example 28 | distilled | 3 | 0.510 | 126 | 4.5 |
| Example 29 | distilled | 2 | 0.640 | 126 | 3.7 |
| Example 30 | distilled | 3 | 0.658 | 123 | 7.0 |
| Example 31 | distilled | 2 | 0.590 | 123 | 6.5 |
| Reference Example 1 | none | 400 | not polymerized | — | — |
| Reference Example 2 | none | 50 | not polymerized | — | — |
| Reference Example 3 | none | 20 | not polymerized | — | — |
| Reference Example 4 | none | 50 | not polymerized | — | — |

As seen from Table 2, the polycarbonate copolymer of the present invention exhibits tensile yield strength, tensile yield modulus and elongation at yield equal to or greater than those of the commercially available polycarbonates and has high Izod impact strength.

As seen from Table 3, the polycarbonate copolymer of the present invention has a small refractive index and a large Abbe number as compared with the commercially available polycarbonate or conventional polycarbonate.

As seen from Table 4, the polycarbonate copolymer of the present invention has high thermal stability as compared with the commercially available polylactic acid or conventional polycarbonate.

It is understood from these results that the polycarbonate copolymer of the present invention has excellent mechanical strength, good thermal stability, small refractive index, large Abbe number and high transparency and can be suitably used for an optical material or various molding materials.

As seen from Table 5, the polycarbonate copolymer of the present invention has a small photoelastic coefficient and can be suitably used for a film or an optical material such as lens.

As seen from Table 6, the polycarbonate of the present invention obtained by copolymerizing an alicyclic dihydroxy compound is smaller in the amount of the generated gas than the polycarbonate obtained by copolymerizing an aliphatic diol. That is, when an aliphatic diol such as 1,4-butanediol and 1,6-hexanediol is used as a dihydroxy compound, generation of a gas derived from the diol, such as cyclic ether, is observed, but when an alicyclic diol such as cyclohexanedimethanol and tricyclodecanedimethanol is used, this generated gas is scarcely observed. Accordingly, it is revealed that the alicyclic diol-containing polycarbonate less affects the environment when used in home electric appliances and the like, such as optical film.

As seen from Table 7, the polycarbonate copolymer of the present invention has high pencil hardness and can be suitably used for film usage or structure material usage such as housing, in which high surface hardness is required and the surface is averse to scratching.

As seen from Table 8, a polycarbonate copolymer more reduced in coloration can be obtained by using isosorbide from which formic acid is removed by distillation or the like.

While the present invention has been described in detail and with reference to specific embodiments thereof, it will be apparent to one skilled in the art that various changes and modifications can be made therein without departing from the spirit and scope thereof.

This application is based on Japanese Patent Application (Patent Application No. 2006-168929) filed on Jun. 19, 2006, the contents of which are incorporated herein by way of reference.

INDUSTRIAL APPLICABILITY

The polycarbonate copolymer of the present invention is suitably used in the field of film or sheet requiring flexibility, in the field of bottle or container requiring heat resistance, for various structure materials requiring impact strength, for lens usage such as camera lens, viewfinder lens and lens for CCD or CMOS, for usage as a film or sheet such as phase difference film, diffusing sheet or polarizing film utilized in a liquid crystal display, a plasma display device or the like, and for usage as an optical disc, film or sheet, as an optical material, as an optical component or as a binder for fixing a dye, a charge transfer agent or the like.

The invention claimed is:

1. A polycarbonate copolymer comprising a constitutional unit derived from a dihydroxy compound represented by the following formula (1) and a constitutional unit derived from an alicyclic dihydroxy compound, wherein the Abbe number is 50 or more and the 5% thermal reduction temperature is 340° C. or more:

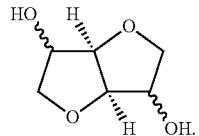

(1)

2. A polycarbonate copolymer comprising a constitutional unit derived from a dihydroxy compound represented by the following formula (1) and a constitutional unit derived from an alicyclic dihydroxy compound,
wherein the ratio of the dihydroxy compound represented by the following formula (1) and the alicyclic dihydroxy compound to all dihydroxy compounds constituting said copolymer is 90 mol % or more,
wherein the constitutional unit derived from the dihydroxy compound represented by the following formula (1): the constitutional unit derived from the alicyclic dihydroxy compound is in a range of from 10:90 to 90:10 (mol %), and
wherein the alicyclic dihydroxy compound is selected from the group consisting of cyclohexanedimethanols, tricyclodecanedimethanols, adamantanediols and pentacyclopentadecanedimethanols:

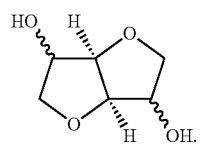

(1)

3. The polycarbonate copolymer as claimed in claim 1, wherein the ratio of the dihydroxy compound represented by formula (1) and the alicyclic dihydroxy compound to all dihydroxy compounds constituting the polycarbonate copolymer is 90 mol % or more.

4. The polycarbonate copolymer as claimed in claim 1, wherein said alicyclic dihydroxy compound contains a 5-membered ring structure or a 6-membered ring structure.

5. The polycarbonate copolymer as claimed in claim 4, wherein the number of carbon atoms contained in said alicyclic dihydroxy compound is 30 or less.

6. The polycarbonate copolymer as claimed in claim 5, wherein said alicyclic dihydroxy compound is at least one compound selected from the group consisting of cyclohexanedimethanol, tricyclodecanedimethanol, adamantanediol and pentacyclopentadecanedimethanol.

7. The polycarbonate copolymer as claimed in claim 1, wherein the photoelastic coefficient is $20 \times 10^{-12}$ $Pa^{-1}$ or less.

8. The polycarbonate copolymer as claimed in claim 2, wherein the photoelastic coefficient is $20 \times 10^{-12}$ $Pa^{-1}$ or less.

9. The polycarbonate copolymer as claimed in claim 1, wherein the Izod impact strength is 30 $J/m^2$ or more.

10. The polycarbonate copolymer as claimed in claim 2, wherein the Izod impact strength is 30 $J/m^2$ or more.

11. The polycarbonate copolymer as claimed in claim 1, wherein the amount of the generated gas except for a phenol component per unit area at 110° C. is 5 $ng/cm^2$ or less.

12. The polycarbonate copolymer as claimed in claim 2, wherein the amount of the generated gas except for a phenol component per unit area at 110° C. is 5 $ng/cm^2$ or less.

13. The polycarbonate copolymer as claimed in claim 1, wherein a constitutional unit derived from at least one member selected from the group consisting of isosorbide, isomannide and isoidide is contained as said constitutional unit derived from a dihydroxy compound represented by formula (1).

14. The polycarbonate copolymer as claimed in claim 2, wherein a constitutional unit derived from at least one member selected from the group consisting of isosorbide, isomannide and isoidide is contained as said constitutional unit derived from a dihydroxy compound represented by formula (1).

15. The polycarbonate copolymer as claimed in claim 1, wherein the reduced viscosity for a concentration of 1.00 g/dl at 20° C.±0.1° C. in a solution of phenol and 1,1,2,2-tetrachloroethane at a weight ratio of 1:1 is 0.40 dl/g or more.

16. The polycarbonate copolymer as claimed in claim 2, wherein the reduced viscosity for a concentration of 1.00 g/dl at 20° C.±0.1° C. in a solution of phenol and 1,1,2,2-tetrachloroethane at a weight ratio of 1:1 is 0.40 dl/g or more.

17. A method of producing the polycarbonate copolymer claimed in claim 1, comprising reacting a dihydroxy compound represented by the following formula (1) and an alicyclic dihydroxy compound with a carbonic acid diester in the presence of a polymerization catalyst:

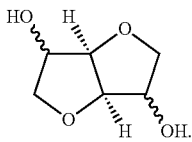

18. A method of producing the polycarbonate copolymer claimed in claim 2, comprising reacting a dihydroxy compound represented by the following formula (1) and an alicyclic dihydroxy compound with a carbonic acid diester in the presence of a polymerization catalyst:

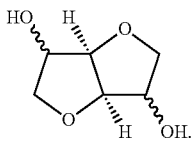

19. The method of producing the polycarbonate copolymer as claimed in claim 17, wherein an alkali metal compound, an alkaline earth metal compound or both the compounds are used as the polymerization catalyst.

20. The method of producing the of producing the polycarbonate copolymer as claimed in claim 18, wherein an alkali metal compound, an alkaline earth metal compound or both the compounds are used as the polymerization catalyst.

21. A polycarbonate copolymer comprising a constitutional unit derived from a dihydroxy compound represented by the following formula (1) and a constitutional unit derived from an alicyclic dihydroxy compound, wherein the Abbe number is 50 or more and the 5% thermal reduction temperature is 340° C. or more:

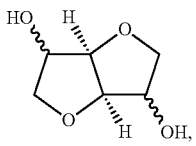

wherein the polycarbonate polymer is composed of, in terms of dihydroxy compounds, only the dihydroxy compound of formula (1) and the alicyclic dihydroxy compound.

22. A polycarbonate copolymer comprising a constitutional unit derived from a dihydroxy compound represented by the following formula (1) and a constitutional unit derived from an alicyclic dihydroxy compound, wherein the ratio of the dihydroxy compound represented by the following formula (1) and the alicyclic dihydroxy compound to all dihydroxy compounds constituting said copolymer is 90 mol % or more, wherein the constitutional unit derived from the dihydroxy compound represented by the following formula (1): the constitutional unit derived from the alicyclic dihydroxy compound is in a range of from 10:90 to 90:10 (mol %), and wherein the alicyclic dihydroxy compound is selected from the group consisting of cyclohexanedimethanols, tricyclodecanedimethanols, adamantanediols and pentacyclopentadecanedimethanols:

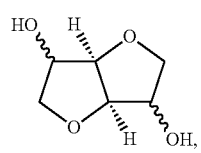

wherein the polycarbonate polymer is composed of, in terms of dihydroxy compounds, only the dihydroxy compound of formula (1) and the alicyclic dihydroxy compound.

23. The polycarbonate copolymer of claim 2, which has an Abbe number of 50 or more.

* * * * *